United States Patent
Broberg et al.

(10) Patent No.: US 11,888,604 B2
(45) Date of Patent: *Jan. 30, 2024

(54) SYSTEMS AND METHODS FOR JOINING A SHARED LISTENING SESSION

(71) Applicant: Spotify AB, Stockholm (SE)

(72) Inventors: Erik Broberg, Stockholm (SE); Claes Johan Daniel Collin, Stockholm (SE)

(73) Assignee: Spotify AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/677,803

(22) Filed: Feb. 22, 2022

(65) Prior Publication Data

US 2022/0247802 A1 Aug. 4, 2022

Related U.S. Application Data

(63) Continuation of application No. 16/868,404, filed on May 6, 2020, now Pat. No. 11,283,846.

(51) Int. Cl.
| | |
|---|---|
| *H04L 65/4053* | (2022.01) |
| *G06F 16/638* | (2019.01) |
| *H04L 65/611* | (2022.01) |

(52) U.S. Cl.
CPC ........ *H04L 65/4053* (2013.01); *G06F 16/639* (2019.01); *H04L 65/611* (2022.05)

(58) Field of Classification Search
CPC ............. H04L 65/4053; H04L 65/4076; H04L 67/1095; H04L 65/60; H04L 65/611;

(Continued)

(56) References Cited

U.S. PATENT DOCUMENTS

| | | |
|---|---|---|
| 5,758,259 A | 5/1998 | Lawler |
| 5,801,747 A | 9/1998 | Bedard |

(Continued)

FOREIGN PATENT DOCUMENTS

| | | |
|---|---|---|
| EP | 0881591 A1 | 12/1998 |
| EP | 3543865 A1 | 9/2019 |

(Continued)

OTHER PUBLICATIONS

Spotify AB, Communication pursuant to Article 94(3), EP21165870.3, dated Oct. 20, 2022, 5 pgs.

(Continued)

*Primary Examiner* — Joseph L Greene
(74) *Attorney, Agent, or Firm* — Morgan, Lewis & Bockius LLP

(57) ABSTRACT

A server system stores a list of trusted users that are authorized to access a first electronic device's shared listening sessions. While the first electronic device is hosting a shared listening session playing back media on a second electronic device, the server system receives, from a third electronic device, a request that includes an identifier of the second electronic device. In response to the first request and in accordance with a determination that the third electronic device is associated with a user that is on the list of trusted users, the server system automatically transmits, to the third electronic device, a session identifier for the first shared listening session. The server system receives, from the third electronic device, a request to join the shared listening session, in response to the second request, provides, to the third electronic device, access to control media playback of the first listening session.

17 Claims, 14 Drawing Sheets

(58) Field of Classification Search
CPC ............ G06F 16/639; H04M 1/72442; H04M 1/72508; H04M 2203/50; H04M 2203/5009; H04N 21/8113; H04H 2201/20; H04H 2201/40; H04R 29/001
See application file for complete search history.

(56) References Cited

U.S. PATENT DOCUMENTS

| | | | |
|---|---|---|---|
| 5,848,398 | A | 12/1998 | Martin et al. |
| 6,005,597 | A | 12/1999 | Barrett et al. |
| 6,175,844 | B1 | 1/2001 | Stolin |
| 6,947,922 | B1 | 9/2005 | Glance |
| 9,112,849 | B1 | 8/2015 | Werkelin Ahlin et al. |
| 9,160,786 | B1 | 10/2015 | Jackson |
| 9,432,429 | B1 | 8/2016 | Ho |
| 9,444,565 | B1* | 9/2016 | Leopardi ................ H04L 65/60 |
| 9,568,994 | B2 | 2/2017 | Jehan |
| 10,063,600 | B1 | 8/2018 | Marsh et al. |
| 10,108,708 | B2 | 10/2018 | O'Driscoll et al. |
| 2002/0174428 | A1 | 11/2002 | Agnihotri et al. |
| 2003/0160770 | A1 | 8/2003 | Zimmerman |
| 2003/0208767 | A1 | 11/2003 | Williamson et al. |
| 2006/0033958 | A1 | 2/2006 | d'Entrecasteaux |
| 2006/0167576 | A1 | 7/2006 | Rosenberg |
| 2006/0242661 | A1 | 10/2006 | Bodlaender et al. |
| 2007/0100481 | A1 | 5/2007 | Toms et al. |
| 2007/0233743 | A1 | 10/2007 | Rosenberg |
| 2008/0091717 | A1 | 4/2008 | Garbow |
| 2008/0166967 | A1 | 7/2008 | McKillop |
| 2008/0261533 | A1 | 10/2008 | Bengtsson |
| 2008/0309647 | A1 | 12/2008 | Blose et al. |
| 2009/0063971 | A1 | 3/2009 | White et al. |
| 2009/0171487 | A1* | 7/2009 | Wilhelm ................ G11B 27/10 700/94 |
| 2009/0210415 | A1 | 8/2009 | Martin et al. |
| 2009/0217804 | A1 | 9/2009 | Lu et al. |
| 2009/0222392 | A1 | 9/2009 | Martin et al. |
| 2009/0300008 | A1 | 12/2009 | Hangartner et al. |
| 2009/0307731 | A1 | 12/2009 | Beyabani |
| 2010/0044121 | A1 | 2/2010 | Simon et al. |
| 2010/0106799 | A1 | 4/2010 | Calabrese |
| 2010/0205222 | A1 | 8/2010 | Gajdos et al. |
| 2010/0325135 | A1 | 12/2010 | Chen et al. |
| 2011/0004330 | A1 | 1/2011 | Rothkopf et al. |
| 2011/0106744 | A1 | 5/2011 | Becker et al. |
| 2011/0162001 | A1 | 6/2011 | Mehta et al. |
| 2011/0289155 | A1 | 11/2011 | Pimazar |
| 2011/0295843 | A1 | 12/2011 | Ingrassia, Jr. et al. |
| 2011/0314388 | A1 | 12/2011 | Wheatley |
| 2012/0117026 | A1 | 5/2012 | Cassidy |
| 2012/0117488 | A1 | 5/2012 | Amidon et al. |
| 2012/0209954 | A1 | 8/2012 | Wright |
| 2012/0290648 | A1 | 11/2012 | Sharkey |
| 2012/0290653 | A1 | 11/2012 | Sharkey |
| 2013/0018954 | A1 | 1/2013 | Cheng |
| 2013/0031162 | A1 | 1/2013 | Willis et al. |
| 2013/0198633 | A1 | 8/2013 | Hyman |
| 2013/0297599 | A1 | 11/2013 | Henshall |
| 2013/0297698 | A1 | 11/2013 | Odero et al. |
| 2013/0346875 | A1 | 12/2013 | Klein et al. |
| 2014/0028784 | A1 | 1/2014 | Deyerle et al. |
| 2014/0031961 | A1 | 1/2014 | Wansley et al. |
| 2014/0108946 | A1 | 4/2014 | Olofsson |
| 2014/0119407 | A1 | 5/2014 | Miller |
| 2014/0123165 | A1 | 5/2014 | Mukhenjee et al. |
| 2014/0223099 | A1 | 8/2014 | Kidron |
| 2014/0245336 | A1 | 8/2014 | Lewis, II et al. |
| 2014/0277649 | A1 | 9/2014 | Chong et al. |
| 2015/0178624 | A1 | 6/2015 | Chee et al. |
| 2015/0222680 | A1 | 8/2015 | Grover |
| 2015/0249857 | A1 | 9/2015 | Dion et al. |
| 2015/0277852 | A1 | 10/2015 | Burgis |
| 2015/0355879 | A1 | 12/2015 | Beckhardt et al. |
| 2015/0356176 | A1 | 12/2015 | Billinski et al. |
| 2016/0007079 | A1 | 1/2016 | Vega-Zayas et al. |
| 2016/0066038 | A1 | 3/2016 | Chesluk et al. |
| 2016/0080473 | A1 | 3/2016 | Coburn, IV |
| 2016/0085499 | A1 | 3/2016 | Corbin et al. |
| 2016/0127777 | A1 | 5/2016 | Roberts et al. |
| 2016/0156687 | A1 | 6/2016 | Leung |
| 2016/0277802 | A1 | 9/2016 | Bernstein et al. |
| 2016/0292269 | A1 | 10/2016 | O'Driscoll et al. |
| 2016/0292272 | A1 | 10/2016 | O'Driscoll et al. |
| 2016/0330794 | A1 | 11/2016 | Ozcan |
| 2017/0034263 | A1 | 2/2017 | Archambault et al. |
| 2017/0093769 | A1 | 3/2017 | Lind et al. |
| 2017/0093943 | A1 | 3/2017 | Alsina |
| 2017/0103075 | A1 | 4/2017 | Toumpelis |
| 2017/0171898 | A1 | 6/2017 | Jamal-Syed et al. |
| 2017/0251040 | A1 | 8/2017 | Archambault et al. |
| 2017/0289202 | A1* | 10/2017 | Krasadakis ............ H04L 67/06 |
| 2018/0139155 | A1 | 5/2018 | Kurisu et al. |
| 2019/0018644 | A1 | 1/2019 | Kovacevic et al. |
| 2019/0050483 | A1 | 2/2019 | O'Driscoll et al. |
| 2019/0121823 | A1 | 4/2019 | Miyazaki et al. |
| 2019/0141089 | A1* | 5/2019 | Loheide ............ H04N 21/2668 |
| 2019/0243534 | A1 | 8/2019 | Vega et al. |
| 2019/0325035 | A1 | 10/2019 | Sagui et al. |
| 2019/0370280 | A1 | 12/2019 | Shenoy et al. |
| 2020/0082019 | A1 | 3/2020 | Allen et al. |
| 2021/0141589 | A1* | 5/2021 | Taylor ................ H04L 65/1089 |

FOREIGN PATENT DOCUMENTS

| | | |
|---|---|---|
| EP | 3554091 A1 | 10/2019 |
| WO | WO2016156553 | 10/2016 |
| WO | WO2016156554 | 10/2016 |
| WO | WO2016156555 | 10/2016 |

OTHER PUBLICATIONS

Broberg, Office Action, U.S. Appl. No. 16/868,404, dated Mar. 18, 2021, 9 pgs.

Broberg, Final Office Action, U.S. Appl. No. 16/868,404, dated Aug. 5, 2021, 12 pgs.

Broberg, Notice of Allowance, U.S. Appl. No. 16/868,404, dated Nov. 19, 2021, 7 pgs.

Spotify AB, International Search Report and Written Opinion, PCT/EP2016/057176, dated Jun. 14, 2016, 10 pgs.

Hernejarvi, Office Action, U.S. Appl. No. 16/784,090, dated Jan. 29, 2021, 8 pgs.

Hernejarvi, Notice of Allowance, U.S. Appl. No. 16/784,090, dated Mar. 31, 2021, 5 pgs.

Hernejarvi, Office Action, U.S. Appl. No. 16/903,078, dated Sep. 10, 2021, 20 pgs.

Hernejarvi, Final Office Action, U.S. Appl. No. 16/903,078, dated Mar. 28, 2022, 27 pgs.

Hernejarvi, Notice of Allowance, U.S. Appl. No. 16/903,078, dated Jul. 13, 2022, 9 pgs.

Hernejarvi, Office-Action, U.S. Appl. No. 17/362,508, dated May 9, 2022, 13 pgs.

Hernejarvi, Notice of Allowance, U.S. Appl. No. 17/362,508, dated Aug. 17, 2022, 8 pgs.

Nelson Granados, Flo: Finally, an app that lets partygoers mix the playlist on the fly, May 27, 2016, https://www.forbes.com/sites/nelsongranados/2016/05/27/flo-finally-an-app-to-crowdsource-live-the-partys-playlist/#41e8d2a45c41, 4 pgs.

News Watch, Party Play—A collaborative playlist from all your party guests, Oct. 20, 2017, https://newswatchtv.com/2017/10/20/party-play-newswatch-review/, 2 pgs.

Buskirk, AudioVroom changes the social radio game, http://evolver.fm/2011/03/23/audiovroom-changes-the-social-radio-game/, Mar. 23, 2011, 5 pgs.

O'Driscoll, Office Action, U.S. Appl. No. 15/087,448, dated Aug. 1, 2016, 20 pgs.

O'Driscoll, Final Office Action, U.S. Appl. No. 15/087,448, dated Jan. 19, 2017, 24 pgs.

O'Driscoll, Office Action, U.S. Appl. No. 15/087,448, dated Aug. 3, 2017, 37 pgs.

(56) References Cited

OTHER PUBLICATIONS

O'Driscoll, Final Office Action, U.S. Appl. No. 15/087,448, dated Mar. 12, 2018, 39 pgs.
O'Driscoll, Office Action, U.S. Appl. No. 15/087,448, dated Aug. 15, 2018, 33 pgs.
O'Driscoll, Final Office Action, U.S. Appl. No. 15/087,448, dated Mar. 27, 2019, 42 pgs.
O'Driscoll, Office Action, U.S. Appl. No. 15/087,448, dated Nov. 21, 2019, 45 pgs.
O'Driscoll, Final Office Action, U.S. Appl. No. 15/087,448, dated Jul. 13, 2020, 45 pgs.
Pauws, et al., "Fast Generation of Optimal Music Playlists using Local Search", Philips Research Europe, 2006, 6 pages.
Patricks, Notice of Allowance, U.S. Appl. No. 16/903,085, dated Jul. 23, 2021, 5 pgs.
Patricks, Office Action, U.S. Appl. No. 16/903,085, dated Mar. 29, 2021, 8 pgs.
Patricks, Office Action, U.S. Appl. No. 16/903,078, dated Sep. 10, 2021, 20 pgs.
Patricks, Final Office Action, U.S. Appl. No. 16/903,078, dated Mar. 28, 2022, 27 pgs.
Patricks, Office Action, U.S. Appl. No. 17/506,512, dated Jul. 27, 2022, 7 pgs.
Patricks, Notice of Allowance, U.S. Appl. No. 17/506,512, dated Sep. 28, 2022, 5 pgs.
Spotify AB, Extended European Search Report, EP21165870.3, dated Jun. 8, 2021, 7 pgs.
Stojmenovic, et al., "Bluetooth scatternet formation in ad hoc wireless networks", University of Ottawa, Jan. 2006, 28 pages.
Sutterer, et al., "UPOS: User Profile Ontology with Situation-Dependent Preferences Support", First International Conference on Advances in Computer-Human Interaction, Mar. 2008, pp. 230-235, 6 pages.
Wang, et al., "Context-Aware Mobile Music Recommendation for Daily Activities", School of Computing, National University of Singapore, MM'12, Oct. 29-Nov. 2, 2012, pp. 99-108, 10 pages.
Xiao, et al., "Learning a Music Similarity Measure on Automatic Annotations with Application to Playlist Generation", CASSP 2009, pp. 1885-1888, 4 pages.
Written Opinion of the International Preliminary Examining Authority dated Jun. 10, 2016 for PCT International Patent Application No. PCT/EP2016/057177, 8 pages.
International Search Report and Written Opinion of the International Searching Authority dated Jul. 11, 2016 for PCT International Patent Application No. PCT/EP2016/057175, 12 pages.
United States Patent and Trademark Office, Office Action dated Sep. 22, 2016 for U.S. Appl. No. 15/087,455, 10 pages.
United States Patent and Trademark Office, Office Action dated Sep. 26, 2016 for U.S. Appl. No. 15/087,428, 9 pages.
United States Patent and Trademark Office, Final Office Action dated Mar. 8, 2017 for U.S. Appl. No. 15/087,455, 11 pages.
United States Patent and Trademark Office, Office Action dated Mar. 29, 2017 for U.S. Appl. No. 15/087,428, 14 pages.
International Preliminary Report on Patentability dated May 31, 2017 for PCT International Patent Application No. PCT/EP2016/057176, 11 pages.
United States Patent and Trademark Office, Office Action dated Oct. 26, 2017 for U.S. Appl. No. 15/087,455, 13 pages.
United States Patent and Trademark Office, Office Action dated Jan. 5, 2018 for U.S. Appl. No. 15/087,428, 16 pages.
Communication pursuant to Article 94(3) EPC dated Apr. 24, 2018 for EP Application No. 16712927.9, 5 pages.
Communication pursuant to Article 94(3) EPC dated Apr. 24, 2018 for EP Application No. 16712928.7, 6 pages.
United States Patent and Trademark Office, Notice of Allowance dated Jun. 14, 2018 for U.S. Appl. No. 15/087,455, 27 pages.
United States Patent and Trademark Office, Office Action dated Aug. 2, 2018 for U.S. Appl. No. 15/087,428, 16 pages.
Summons to attend oral proceedings pursuant to Rule 115(1) EPC dated Oct. 10, 2018 for EP Application No. 16712927.9, 7 pages.
Result of consultation by telephone from the applicant dated Feb. 8, 2019 for EP Application No. 16712927.9, 4 ages.
Communication pursuant to Article 94(3) EPC dated May 10, 2019 for EP Application No. 16712928.7, 8 pages.
United States Patent and Trademark Office, Office Action dated Jun. 20, 2019 for U.S. Appl. No. 15/087,428, 15 pages.
Decision to grant a European patent pursuant to Article 97(1) EPC dated Jul. 11, 2019 for EP Application No. 16712927.9, 2 pages.
Extended European Search Report dated Jul. 11, 2019 for EP Application No. 19172512.6, 10 pages.
United States Patent and Trademark Office, Office Action dated Feb. 13, 2020 for U.S. Appl. No. 15/087,428, 17 pages.
Elliott et al., Personal Soundtrack: Context-aware playlists that adapt to user pace, Proceedings of ACM CHI 2006, Apr. 22-28, 2006, Montreal, Quebec, Canada, pp. 736-741 (Year: 2006).

* cited by examiner

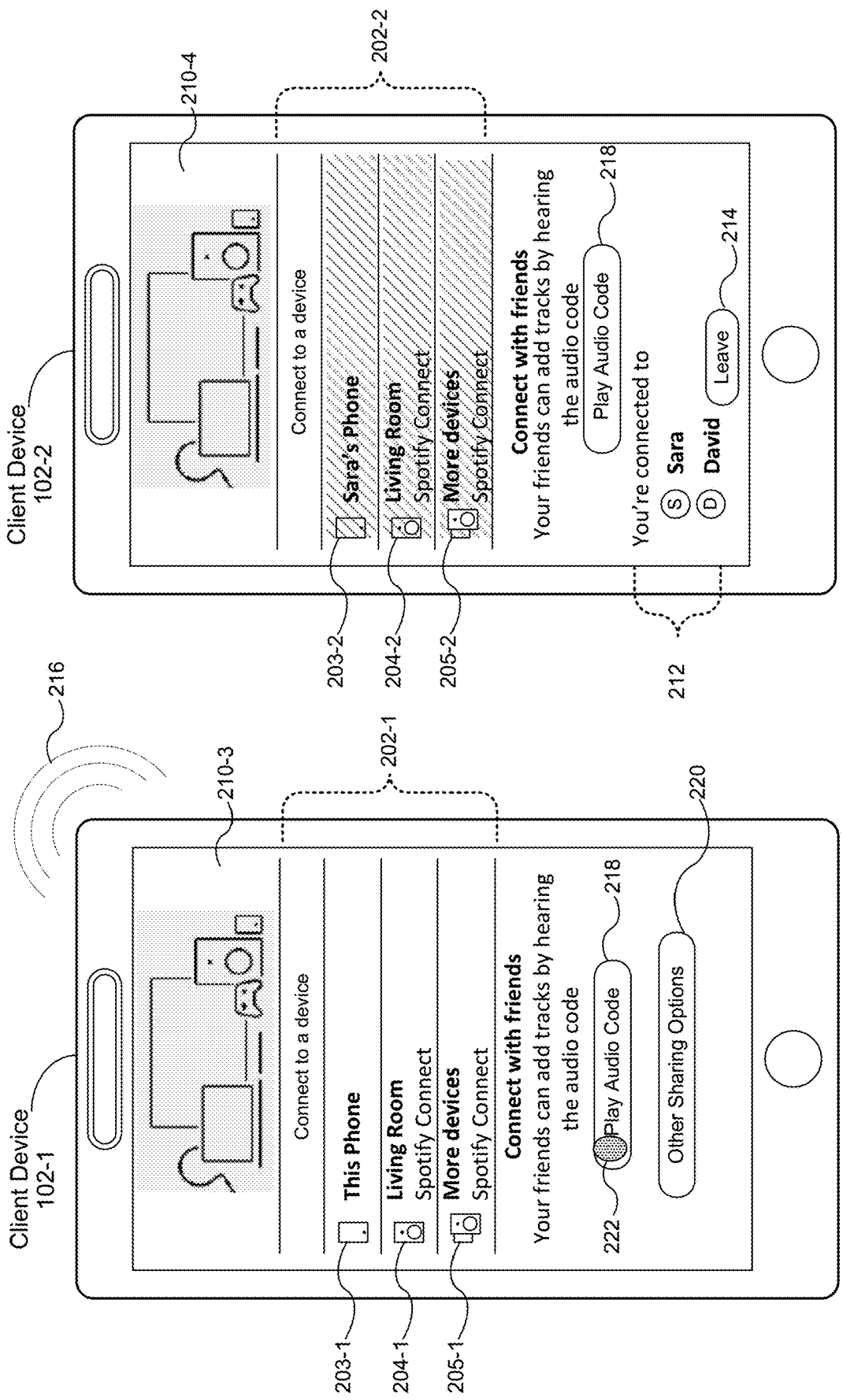

SYSTEMS AND METHODS FOR JOINING A SHARED LISTENING SESSION

RELATED APPLICATION

This application is a continuation of U.S. application Ser. No. 16/868,404, filed May 6, 2020, entitled, "Systems and Methods for Joining a Shared Listening Session," which is incorporated by reference in its entirety.

TECHNICAL FIELD

The disclosed embodiments relate generally to media playback, and, in particular, frictionless joining of shared listening sessions (also called social sessions or shared playback sessions).

BACKGROUND

Access to electronic media, such as music and video content, has expanded dramatically over time. As a departure from physical media, media content providers stream media to electronic devices across wireless networks, improving the ease with which users can access such content.

Some devices, such as speakers, can provide media content to numerous users at the same time. Typically, one user controls the media content playback on the device (e.g., speaker). However, different users may also want access to the device to control media playback (e.g., play, pause, skip, rewind).

SUMMARY

Streaming media content to many electronic devices associated with many different users creates an opportunity to allow multiple users to have a shared media content experience. For example, a shared user experience allows each member within a group of users to contribute to and control a collection of media content. In this way, a plurality of users is enabled to access, contribute to, and control playback of media content items.

There is a need for systems and methods for frictionless joining of a shared listening session on a target device. For example, a first user may use a first device (e.g., cell phone, web browser) to begin a listening session at a second device (e.g., speaker). A second user may have a third device (e.g., cell phone, web browser) and want to control playback of the listening session on the second device. Some embodiments described herein provide systems and methods that allow the second user to join the first user's shared listening session, without interaction between the two user's devices and, in some embodiments, without the first user expressly approving the request for the second user to join. To that end, in some embodiments, the second user's device discovers nearby devices (e.g., speakers) without user intervention (e.g., over a wireless local area network (WLAN)), and requests, from a server, session identifiers for shared listening sessions playing on such devices. The second user can then request to join the shared listening sessions. In some embodiments, previous permissions received from the first user are used by the server to determined, without further intervention from the first user, whether to allow the second user to join the first user's shared listening session.

For example, John is hosting a party at his house and has invited both Sally and Kim to join him. John is using his cell phone to play music on his stereo and has made the listening session available as a social session (e.g., available to join). Upon starting the social session, John's speaker communicates to a server that the social session has been initiated at the speaker. Sally and Kim arrive at John's house and their cell phones connect to John's home WLAN. Both Sally and Kim's phones retrieve a speaker identifier from John's stereo. Using the speaker identifier, and without user intervention, Sally and Kim's phones retrieve, from the server, session information for the social session. Sally and Kim receive access to the social session (e.g., based on previously stored permissions), and a shared set of controls is sent to their phones to control media playback on John's stereo.

In accordance with some embodiments, a method is performed at a server system associated with a media-providing service. The server system includes one or more processors and memory storing instructions for execution by the one or more processors. The method includes receiving, from a first electronic device, an indication that the first electronic device has shared a first listening session playing back on a second electronic device. The method includes receiving, from a third electronic device, a first request for one or more shared listening sessions playing back on the second electronic device wherein the first request includes an identifier of the second electronic device. In response to the first request, the server system transmits to the third electronic device, a session identifier for the first listening session. The method includes receiving, from the third electronic device, a second request to join the first listening session using the session identifier for the first listening session. The method includes providing, to the third electronic device, access to the first listening session playing back on the second electronic device and providing, to the first and third electronic devices, a common set of controls for controlling media-playback of the first listening session at the second electronic device.

In accordance with some embodiments, an electronic device (e.g., a server system, a client device, etc.) includes one or more processors and memory storing one or more programs configured to be executed by the one or more processors. The one or more programs include instructions for receiving, from a first electronic device, an indication that the first electronic device has shared a first listening session playing back on a second electronic device. The second electronic device is distinct from the first electronic device. The one or more programs further include instructions for receiving, from a third electronic device, a first request for one or more shared listening sessions playing back on the second electronic device where the first request includes an identifier of the second electronic device. The second electronic device is distinct from the third electronic device. In response to the first request, the one or more programs further include instructions for transmitting, to the third electronic device, a session identifier for the first listening session. The one or more programs further include instructions for receiving, from the third electronic device, a second request to join the first listening session using the session identifier for the first listening session. The one or more programs further include instructions for providing, to the third electronic device, access to the first listening session playing back on the second electronic device and providing, to the first and third electronic devices, a common set of controls for controlling media-playback of the first listening session at the second electronic device.

In accordance with some embodiments, a non-transitory computer-readable storage medium has stored therein instructions that, when executed by an electronic device, causes the electronic device to, receive, from a first electronic device, an indication that the first electronic device has shared a first listening session playing back on a second electronic device. The instructions further cause the electronic device to receive, from a third electronic device, a first request for one or more shared listening sessions playing back on the second electronic device. The first request includes an identifier of the second electronic device. The instructions further cause the electronic device to transmit, in response to the first request, a session identifier for the first listening session. The instructions further cause the electronic device to receive, from the third electronic device, a second request to join the first listening session using the session identifier for the first listening session and provide, to the third electronic device, access to the first listening session playing back on the second electronic device. The instructions further cause the electronic device to provide, to the first and third electronic devices, a common set of controls for controlling media-playback of the first listening session on the second electronic device.

Thus, the systems and methods described herein provide technical advantages and improve the client and server computers described herein by simplifying the user-machine interface as it relates to accessing and controlling remote devices. More particularly, by seamlessly allowing multiple electronic devices to access a shared listening session, the systems and methods described herein provide multiple users with the convenience of adjusting playback from their individual devices, thus simplifying the user-machine interface (e.g., by eliminating the need for the user to provide a series of inputs to navigate to a settings interface and/or a playback control interface), which, in turn, reduces the processing requirements of the device (e.g., the user need not navigate to an obscure setting interface on his or her device, or remember a peculiar "friendly name" of the speaker, but instead can, seamlessly join a listening session and control playback of media content). By reducing the number of inputs, as compared to methods that require identification of a device "friendly name" and/or express confirmation by the host user, the systems and methods described herein save battery power on mobile devices.

BRIEF DESCRIPTION OF THE DRAWINGS

The embodiments disclosed herein are illustrated by way of example, and not by way of limitation, in the figures of the accompanying drawings. Like reference numerals refer to corresponding parts throughout the drawings and specification.

DETAILED DESCRIPTION

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc., are, in some instances, used herein to describe various elements, these elements should not be limited by these terms. These terms are used only to distinguish one element from another. For example, a first electronic device could be termed a second electronic device, and, similarly, a second electronic device could be termed a first electronic device, without departing from the scope of the various described embodiments. The first electronic device and the second electronic device are both electronic devices, but they are not the same electronic device.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Figure 1:
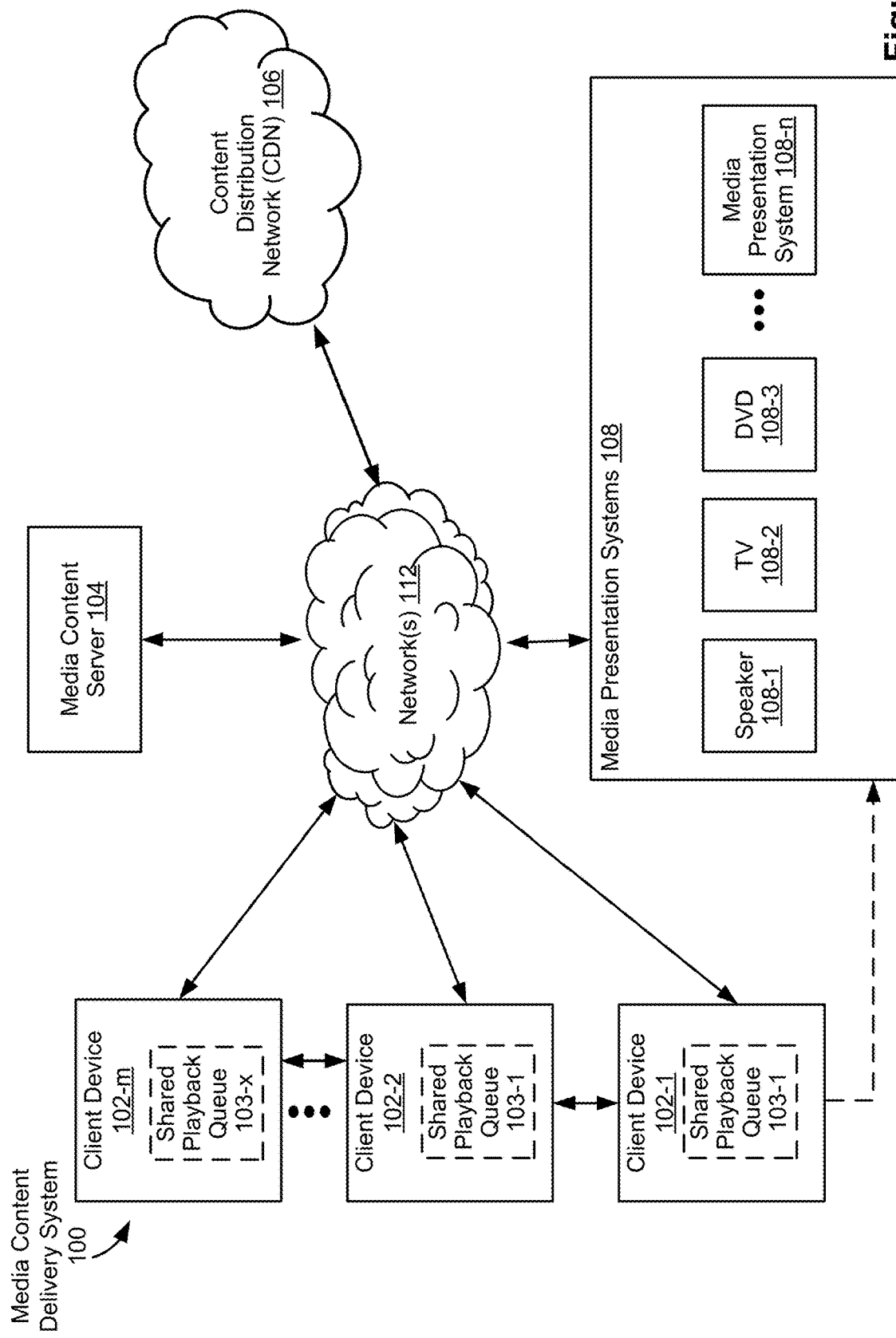
FIG. 1 is a block diagram illustrating a media content delivery system, in accordance with some embodiments.

FIG. 1 is a block diagram illustrating a media content delivery system 100 in accordance with some embodiments. The media content delivery system 100 includes one or more client devices 102 (e.g., client device 102-1 to client device 102-*m*, where m is an integer greater than one), one or more media content servers 104, and one or more media presentation systems 108, including speaker 108-1, television (TV) 108-2, digital versatile disk (DVD) player 108-3, one or more content distribution networks (CDNs) 106, and/or other media presentation system 108-*n* (where n is an integer greater than three). The one or more media content servers 104 are associated with (e.g., at least partially compose) a media-providing service. The one or more CDNs 106 store and/or provide one or more content items (e.g., to electronic devices 102). In some embodiments, the one or more CDNs 106 are associated with the media-providing service. In some embodiments, the CDNs 106 are included in the media content provider servers 104. One or more networks 112 communicably couple the components of the media content delivery system 100. In some embodiments, the one or more networks 112 include public communication networks, private communication networks, or a combination of both public and private communication networks. For example, the one or more networks 112 can be any network (or combination of networks) such as the Internet, other wide area networks (WAN), local area networks (LAN), virtual private networks (VPN), metropolitan area networks (MAN), peer-to-peer networks, and/or ad-hoc connections.

In some embodiments, a client device 102-1, 102-2, or 102-m is associated with one or more users. In some embodiments, a client device 102 is a personal computer, mobile electronic device, wearable computing device, laptop computer, tablet computer, mobile phone, feature phone, smart phone, digital media player, or any other electronic device capable of presenting media content (e.g., audio and/or video). A client device 102 connects to a media presentation system 108 wirelessly or through a wired connection (e.g., directly through an interface, such as an HDMI interface). In some embodiments, a client device 102 is a headless client. In some embodiments, client devices 102-1 and 102-m are the same type of device (e.g., client device 102-1 and client device 102-m are both mobile devices). Alternatively, client device 102-1 and client device 102-m are different types of devices.

In some embodiments, client devices 102-1, 102-2, and 102-m send and receive media-control information through the networks 112. For example, client devices 102-1, 102-2, and 102-m send media control requests (e.g., requests to play music, movies, videos, or other media items, or playlists thereof) to media content server 104 through network(s) 112. In some embodiments, client devices 102-1, 102-2, and 102-m, receive authentication tokens from the media content server 104 through network(s) 112.

In some embodiments, client device 102-1 communicates directly (e.g., through a wired and/or wireless connection) with client devices 102-2 and/or 102-m. For example, in some embodiments client device(s) 102 directly communicate playback commands and/or audio code signals between each other (e.g., the media content server 104 may or may not be involved in the exchange). In some embodiments, client device 102-2 communicates directly with client device 102-m. In some embodiments, client device 102-1 communicates directly with media presentation systems 108. As pictured in FIG. 1, client device 102-1 is able to communicate directly (e.g., through a wired and/or wireless connection) with media presentation systems 108, while client device 102-m communicates with the media presentation systems 108 through network(s) 112. In some embodiments, client device 102-1 uses the direct connection with media presentation systems 108 to stream content (e.g., data for media items) for playback on the media presentation systems 108.

In some embodiments, client device 102-1, client device 102-2 and client device 102-m each include a media application 622 (FIG. 6) that allows a user of the client device to browse, request (e.g., for playback at the client device 102 and/or a media presentation system 108), and/or present media content (e.g., control playback of music tracks, videos, etc.). Media content may be stored locally (e.g., in memory 612 of the client device 102, FIG. 6) and/or received in a data stream (e.g., from the media content server 104). The media presentation system 108 may be part of the client device 102, such as built-in speakers and/or a display, or may be separate from the client device 102, such as a wirelessly coupled speaker (e.g., speaker 108-1).

In some embodiments, client device 102-1 and client device 102-2 each include an instance of shared playback queue 103-1 (e.g., within media application 622). In some embodiments, shared playback queue 103-1 (e.g., for a shared listening session) includes a set (e.g., an ordered list, such as a playlist) of media content items provided by the media content server 104. For example, the media content server 104 establishes a shared listening session (e.g., for two or more client devices of two or more users), stores a shared playback queue corresponding to the shared listening session, and/or provides the shared playback queue to the two or more client devices (e.g., client device 102-1 and client device 102-2). In some embodiments, the two or more client devices 120 are enabled to view and/or edit (e.g., add, remove, and/or reorder) content in the shared playback queue. For example, client device 102-1 and client device 102-2 are each provided with at least a portion of the same shared playback queue 103-1. In some embodiments, the shared playback queue 103-1 includes media content items selected by any combination of client device 102-1, client device 102-2, any other client device(s) 102, presentation systems 108, and/or the media content server 104. In some embodiments, the media content items from the shared playback queue are streamed to (e.g., played at and/or provided to) one or more of media presentation systems 108. For example, each client device 102-1 and client device 102-2 accesses (e.g., views, edits (adds and/or removes media content items from), and/or controls presentation of) the shared playback queue 103-1 while the shared playback queue is presented at one or more of media presentation systems 108. Co-located users are enabled to access the shared playback queue 103-1 on individual devices while streaming media content through media presentation system 108. In some embodiments, the media content items from the shared playback queue are streamed to each of the client devices 102-1 and 102-2 (e.g., instead of or in addition to media presentation system 108). It is to be understood that the shared playback queue 103-1 is enabled to be shared on additional client devices 102 in addition to client device 102-1 and client device 102-2. In some embodiments, a shared playback queue 103-$x$ (distinct from shared playback queue 103-1) is shared between a plurality of client devices 102 (including client device 102-m). For example, the media content server 104 provides a plurality of shared playback queues 103-1 through 103-$x$, where the shared playback queue 103-1 is provided to a first subset of client devices 102 (e.g., client devices 102-1 and 102-2) and the shared playback queue 103-$x$ is provided to a second subset of client devices 102 (e.g., including client device 102-m) (e.g., distinct from the first subset).

In some embodiments, the media content server 104 stores and provides media content (also referred to as media items) (e.g., media content requested by the media application 622 of client device 102-1, 102-2, and/or 102-m, and/or the shared playback queue 103-1) to client devices 102 and/or media presentation systems 108 via the network(s) 112. Content stored and served by the media content server 104, in some embodiments, includes any appropriate content, including audio (e.g., music, spoken word, podcasts, etc.), videos (e.g., short-form videos, music videos, television shows, movies, clips, previews, etc.), text (e.g., articles, blog posts, emails, etc.), images (e.g., photographs, drawings, renderings, etc.), games (e.g., 2- or 3-dimensional graphics-based computer games, etc.), or any combination of content types (e.g., web pages that include any combination of the foregoing types of content or other content not explicitly listed). Audio media items (i.e., audio items) may be referred to as tracks. The description of the media content server 104 as a "server" is intended as a functional description of the devices, systems, processor cores, and/or other components that provide the functionality attributed to the media content server 104. It will be understood that the media content server 104 may be a single server computer, or may be multiple server computers. Moreover, the media content server 104 may be coupled to other servers and/or server systems, or other devices, such as other client devices, databases, content distribution networks (e.g., peer-to-peer networks), network caches, and the like. In some embodiments, the media content server 104 is implemented by multiple computing devices working together to perform the actions of a server system (e.g., cloud computing).

As described above, media presentation systems 108 (e.g., speaker 108-1, TV 108-2, DVD 108-3, media presentation system 108-n) are capable of receiving media content (e.g., from the media content server 104) and presenting the received media content. For example, speaker 108-1 may be a component of a network-connected audio/video system (e.g., a home entertainment system, a radio/alarm clock with a digital display, or an infotainment system of a vehicle). In some embodiments, the media content server 104 sends media content to the media presentation systems 108. For example, media presentation systems 108 include computers, dedicated media players, network-connected stereo and/or speaker systems, network-connected vehicle media systems, network-connected televisions, network-connected DVD players, and universal serial bus (USB) devices used to provide a playback device with network connectivity, and the like.

Figures 2A, 2B:
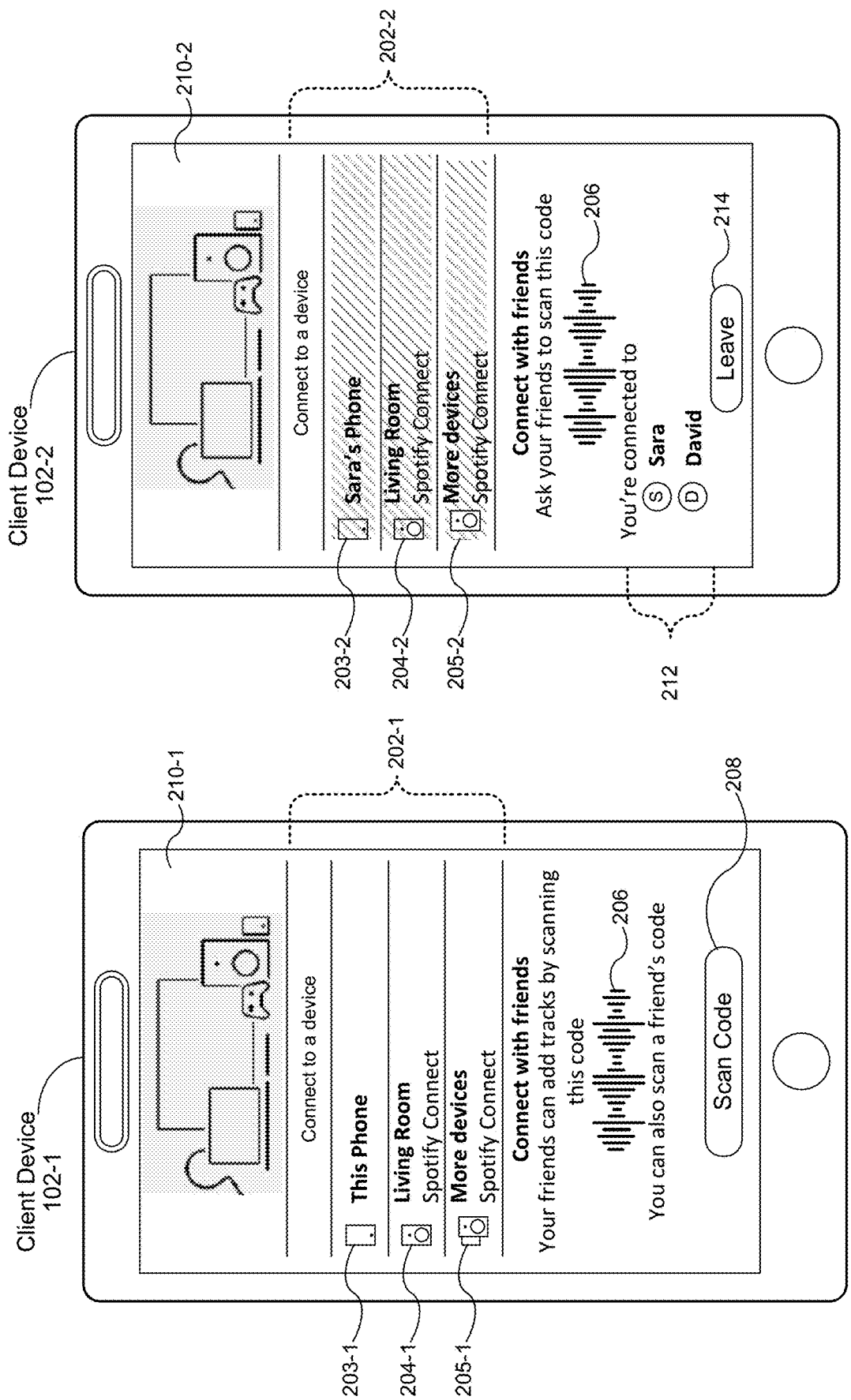
FIGS. 2A-2N illustrate graphical user interfaces for client devices participating in a shared media content session in accordance with some embodiments.

FIG. 2A illustrates a graphical user interface 210-1 displayed by a display of a client device 102-1 associated with a user (e.g., Sara). The graphical user interface 210-1 illustrated in FIG. 2A represents a first sharing interface from a host user's (e.g., Sara's) perspective. In some embodiments, the graphical user interface on device 102-1 includes a device selection portion 202-1. The device selection portion 202-1 includes user interface objects that correspond to one or more presentation devices, such as "This Phone" 203-1, "Living Room" 204-1, and "More devices" 205-1. In some embodiments, the device 102-1 receives a user input at a location that corresponds to a presentation device user interface object in the device selection portion 202-1 to select a presentation device for presentation of the media content (e.g., received by device 102-1 from media-providing server 104). For example, the device receives a user input (e.g., from Sara) at a location corresponding to the displayed user interface object labeled "This Phone" 203-1 to select client device 102-1 as the presentation device. In this manner, client device 102-1 is selected as the playback device for a shared playback queue to which multiple client devices 102 are able to contribute. For example, a single shared playback queue is presented to all users of the shared listening session. In some embodiments, the shared playback queue corresponds to a playlist that includes media content items to be presented (e.g., at the selected presentation device). The users are able to access the queue and/or leave the shared listening session.

In some embodiments, the graphical user interface 210-1 displayed by device 102-1 (and graphical user interface 210-2 displayed by device 102-2) includes a volume control for controlling the playback volume of the selected presentation device.

The first sharing interface 210-1 from the host user's perspective allows the host to initiate a shared playback session (e.g., using the Connect with friends portion of the interface). The shared playback session allows each of the participating users (e.g., the host user and the participants) to access the shared playback queue associated with the playback session. For example, a single shared playback queue is presented to all users of the shared playback session. In some embodiments, the shared playback queue corresponds to a playlist that includes media content items to be presented (e.g., at the selected presentation device). The users are able to access the queue and/or leave the queue.

In some embodiments, to initiate the shared playback session, the client device 102-1 displays a code 206 that can be scanned by a camera or sensor of a second client device (e.g., device 102-2). For example, code 206 is a machine-readable code as described in U.S. Pat. No. 10,133,947, hereby incorporated by reference in its entirety. In some embodiments, code 206 is an image including a row of bars of varying lengths, a bar code, a QR code, or another optical code. The graphical user interface 210-1 displayed by client device 102-1 includes a user-selectable affordance "Scan Code" 208, which, when selected, initiates a mode in which device 102-1 is enabled to scan a code (e.g., using a camera of device 102-1) presented on another user's device (e.g., to join as a participant instead of as a host). For example, the client device 102-1 has the option to either host the shared playback session (e.g., by having another user scan the code 206) or to be a participant in another user's shared playback session (e.g., by selecting "Scan Code" 208 and then scanning a code displayed on another user's device).

FIG. 2B illustrates a graphical user interface 210-2 displayed by client device 102-2 associated with a second user (e.g., David). In some embodiments, graphical user interface 210-1 and graphical user interface 210-2 are generated by a program associated with a media content provider (e.g., media application 622, user interface module 620, and/or a module executed by media content server that transmits graphical user interface data to one or more client devices). In some embodiments, graphical user interfaces 210-3 (FIG. 2C), 210-4 (FIG. 2D), 221-1 (FIG. 2E), and/or 221-2 (FIGS. 2F, 2H, 2I and 2J) are generated by the same software.

Graphical user interface 210-2 is displayed after the client device 102-2 has scanned a code to join a shared playback session. For example, David (using client device 102-2) scans Sara's code 206 (displayed on Sara's device 102-1). In response to scanning Sara's code 206, David has joined a shared playback session with Sara. Alternatively, David may join Sara's shared listening session using any of the "frictionless" joining processes described herein, e.g., with reference to FIGS. 3 and 5A-5B. In some embodiments, Sara is designated to be the host of the shared playback session because Sara's code 206 was used to initiate the shared playback session. In some embodiments, a server system initiates (e.g., establishes) the shared playback session in response to receiving an indication that a first user's code has been scanned by another user of the media-providing service. In some embodiments, a server system initiates (e.g., establishes) the shared listening session in response to receiving an indication that a first user's has shared (exposed) a listening session. In some embodiments, a server system creates a session identifier (ID) associated with the listening session in response to receiving an indication from the first electronic device that the first user has indicated the listening session is available to join as a shared listening session. Making a listening session available to join as a shared listening session is referred to through this disclosure as "exposing" the listening session.

In some embodiments, a first subset of controls for playback of the shared queue are only available to the host and a second subset of controls for playback of the shared queue are available to all members of the shared playback session. As shown in FIG. 2B, graphical user interface 210-2 includes a device selection portion 202-2. In some embodiments, when client device 102-1 is the host device of a shared playback session, client device 102-2 is not enabled to select a presentation device. For example, only the host device of the shared playback session is enabled to select a presentation device for presenting content of the shared playback queue 103 and participants of the shared playback session are not enabled to change the device at which media content is played back. In some embodiments, graphical user interface 210-2 displayed on client device 102-2 includes user interface objects that correspond to one or more presentation devices, such as "Sara's Phone" 203-2, "Living Room" 204-2, and "More devices" 205-2. In some embodiments, the one or more presentation devices indicated in device selection portion 202-2 on graphical user interface 210-2 correspond to the one or more presentation devices indicated in device selection portion 202-1 on graphical user interface 210-1. In some embodiments, the user interface objects 203-2, 204-2 and 205-2 are non-selectable user interface objects (e.g., as indicated by the shading of the user interface objects). In some embodiments, the user of client device 102-2 is not enabled to select the presentation device (e.g., only the host device is enabled to select the presentation device). In some embodiments, a volume control is displayed to all members (e.g., the host and all participants) of a shared playback session, enabling any of the users in the shared playback session to control the loudness of media playback by the presentation device.

In the illustrative example of FIG. 2B, before joining the shared playback session, client device 102-2 (e.g., David's device) was consuming (e.g., listening to) media content (e.g., from David's personal listening queue/music library). For example, the media-providing service was streaming media content from David's personal queue to David at device 102-2. In response to David's device 102-2 scanning code 206 displayed by Sara's device 102-1, the media-providing service stops streaming media content from David's personal queue to device 102-2, and initiates playback of the media content included in a shared playback queue associated with the shared playback session at the presentation device selected by the host (e.g., Sara). In some embodiments, the media-providing service streams the shared playback queue to David's device 102-2 in addition to playback device 102-1.

Client device 102-2 further indicates the user(s) that are connected to the shared playback session in a shared playback session user listing portion 212 (labeled "You're connected to") of the graphical user interface. The shared playback session user listing portion 212 indicates identifying information of users that have joined the shared playback session. Identifying information for the user (e.g., owner) of the device that displays the shared playback session user listing (e.g., "David") may or may not be displayed in the listing. The graphical user interface 210-2 also has a user-selectable affordance to "Leave" 214 the shared playback session. In some embodiments, in response to activation of "Leave" at a device, the device disconnects from the shared playback session.

In some embodiments, after client device 102-2 has joined the shared playback session, the client device 102-2 displays code 206 for the shared playback session that includes client device 102-1 and 102-2 (e.g., the same code 206 is displayed on device 102-1 and device 102-2). Another client device is enabled to join the shared playback session by scanning the code 206 on either client device 102-1 or 102-2 (e.g., every user in the session is enabled to display a code to allow additional users to join the session).

In some embodiments, the code 206 expires after a predefined amount of time. In some embodiments, at the end of the shared playback session, the code 206 ceases to be displayed. In some embodiments, when code 206 ceases to be displayed, a new code (corresponding to a second shared playback session) is displayed. For example, the code 206 is uniquely associated with the shared playback session (e.g., each playback session has its own code). In some embodiments, alternative sharing methods are used in lieu of or in addition to displaying a scannable code. For example, a shared playback session is established via:

playback, by a first (host) device of an audio code that is detectable by a second device, A PIN (e.g., a four (or other integer) digit (numeric and/or alphanumeric) code displayed to the host device) that can be input at a second device, A determination of geographic co-location (e.g., in accordance with a determination that a second device comes within a predetermined distance of a first (host) device), A link (e.g., a universal resource locator) transmitted from the first client device to the second client device (e.g., directly transmitted between client devices or forwarded via media content server 104), and/or a determination that the client devices are connected to a same wireless network (e.g., WLAN).

In some embodiments, the code is assigned to the session by the server system of the media-providing service.

FIGS. 2C-2D illustrate examples of client devices 102-1 and 102-2 using an audio code (e.g., instead of a scannable code 206) to establish and/or connect to the shared playback session. For example, FIG. 2C displays a graphical user interface 210-3 that includes an affordance labeled "Play Audio Code" 218, which, when selected (e.g., by user input 222) causes the client device 102-1 to output an audio signal that corresponds to audio code 216. Audio code 216 is an audio item (e.g., audible range, ultrasonic, and/or infrasonic) that uses one or more audio characteristics (e.g., frequency, duration, amplitude, combinations of tones, and/or variations thereof over time) to identify (e.g., uniquely identify) a shared listening session. In some embodiments one or more speakers of client device 102-1 output an audio code. The client device 102-2 receives audio code 216 using one or more microphones of the client device. Upon receiving audio code 216, client device 102-2 (and/or client device 102-1) transmits information associated with audio code 216 (e.g., the audio code or information generated based on the received audio code) to the media server 104. In response to receiving the information associated with the audio code, the media server causes the shared playback session that is associated with the audio code from client device 102-1 to be joined by client device 102-2.

In some embodiments, the graphical user interface 210-3 displayed by client device 102-1 includes an affordance 220 (labeled "Other Sharing Options") that, when selected, causes a list of options for establishing and/or connecting to the shared playback session to be displayed. In some embodiments, the user selects, from the list of options, a method of connecting to the shared playback session.

FIG. 2D illustrates a graphical user interface 210-4 displayed on client device 102-2 after joining the shared playback session hosted by client device 102-1. For example, client device 102-2 received the audio code 216 output by client device 102-1, and, in response to receiving the audio code 216, joined the shared playback session. In some embodiments, in response to receiving audio code 216, client device 102-1 displays, on graphical user interface 210-4, affordance 218, that, when selected causes client device 102-2 to output the audio code 216 to allow additional users to join via the audio code 216.

Figure 2F:
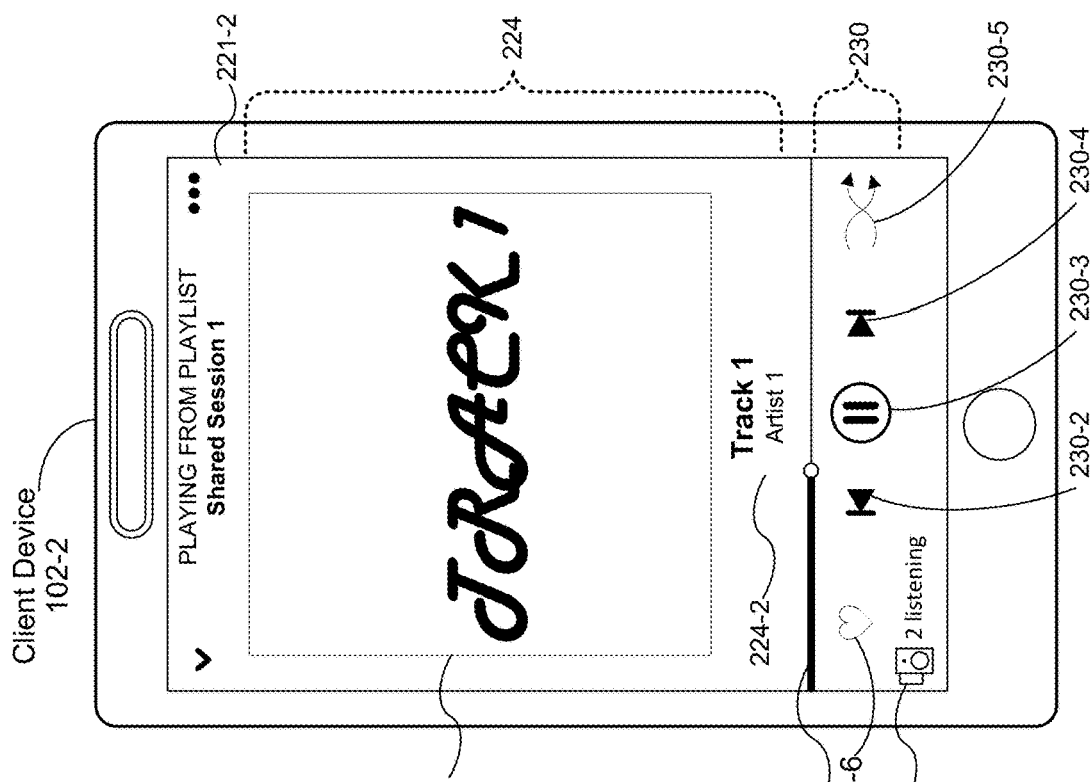
Figure 2E:
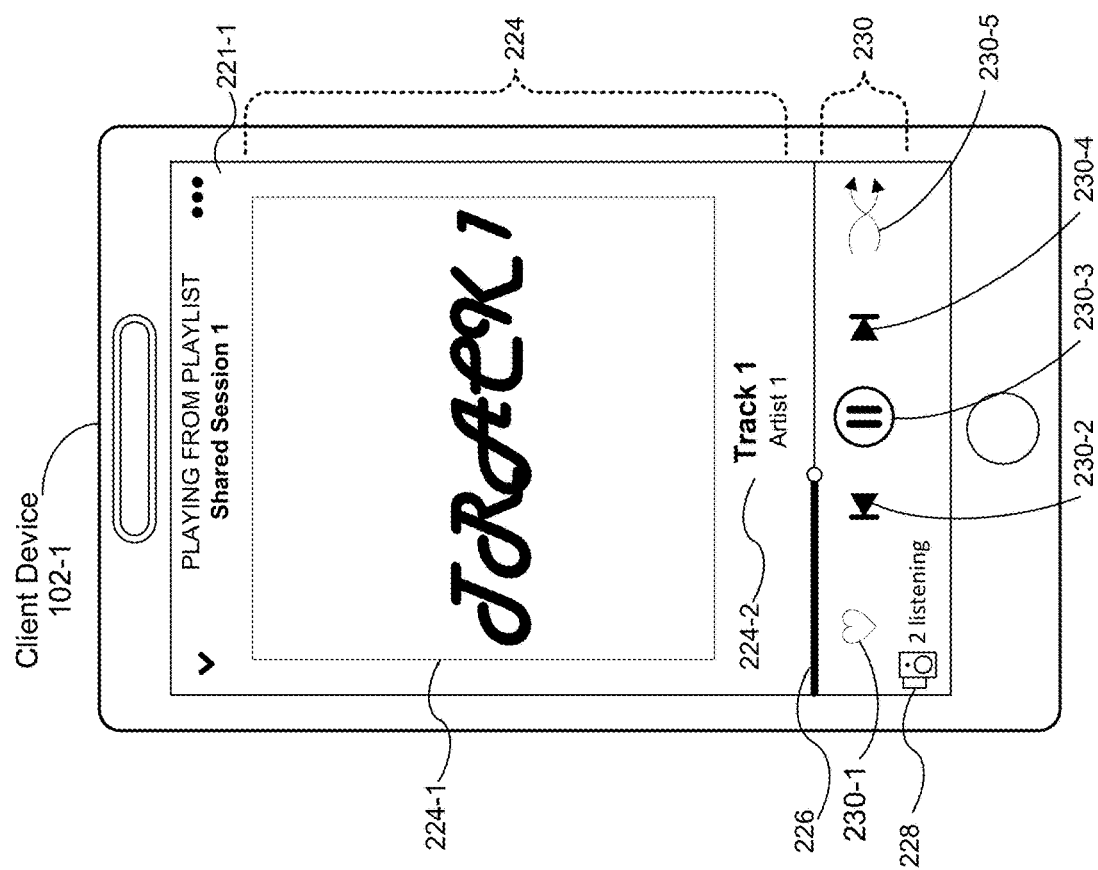

FIGS. 2E and 2F illustrate graphical user interfaces 221-1 and 221-1 presented on client device 102-1 and client device 102-2, respectively, during the shared playback session. Both client devices 102-1 and 102-2 include information regarding the currently presented media content in Playing From Playlist portion 224. In some embodiments, the information includes metadata of the media content that is being presented at the presentation device. For example, the information includes cover art image 224-1 as well as a title and/or artist information 224-2 (e.g., "Track 1," "Artist 1") of the media content item. The information also includes context data regarding the playback of the media content. For example, media scrubber control 226 (e.g., including a playhead that indicates a current playback point in a media item and that, when dragged across a timeline, changes the point in time from which the media item is played back) is presented on the client device. The graphical user interfaces 221-1 and 221-2 also include a connection indication 228, which indicates how many additional users and/or devices are connected to the shared playback session. In some embodiments, the client device 102-1 detects an input at a location that corresponds to connection indication 228. In response to detecting the input at the location that corresponds to connection indication 228, device 102-1 displays a sharing user interface (shown in FIG. 2B).

In some embodiments, one or more controls 230 displayed by client device 102-1 are the same as controls 230 displayed by client device 102-2. While the shared playback session is active, users that have joined the session are able to access the shared queue, and leave the queue. For example, any user is enabled to select to operate skip back 230-2 control to cease playback of the current media content and initiate playback of the prior track, pause (or play) 230-3 control to temporarily stop playback of the currently presented media content item (or resume playback), skip forward 230-4 control to begin playback of a next media content item in the shared playback queue, or shuffle 230-5 control to present the media content items of the shared playback queue out of order (e.g., the order presented as a list). In some embodiments, controls 230 are displayed to only a subset of users (e.g., as selected by the host) in the shared playback session. In some embodiments, the server 104 transmits controls 230 only to the host device (e.g., Sara's device 102-1), and the other users (e.g., client device 102-2) cannot use controls 230 to control playback. In some embodiments, the server transmits (e.g., for display) controls 230 to the devices of other users, but the controls are not selectable by the other users. In some embodiments, a first portion of controls 230 are transmitted, from the server 104, to the host and participants, and a second portion of controls 230 are only transmitted to the host. In some embodiments, at least one control displayed to a user, when operated, affects information stored in association with the user's profile (and does not affect the experience of other users in the shared playback session). For example, the favorite control 230-1 (which, when activated, adds the currently playing media content item to a favorites list and/or to the device's locally stored library) is displayed at device 102-1, while a distinct favorite control 230-6 is displayed at to device 102-2. This way, participants cannot add one or more media content item's to the host's favorites list. Instead, each device (e.g., participant) is enabled to activate the favorite control for the respective user of the device (e.g., each participant has a separate and distinct favorites list). In some embodiments, the favorite control is deactivated for participants (e.g., only the host is enabled to add to the host's favorite list during the shared playback session).

In some embodiments, only a host device of the shared playback session is enabled to control settings of the shared playback session. For example, the server transmits, to a host device, controls for removing and/or blocking participants from joining the shared playback session. In some embodiments, the server transmits, only to the host device, controls to change a presentation device and/or settings of the presentation device (e.g., volume).

Figure 2H:
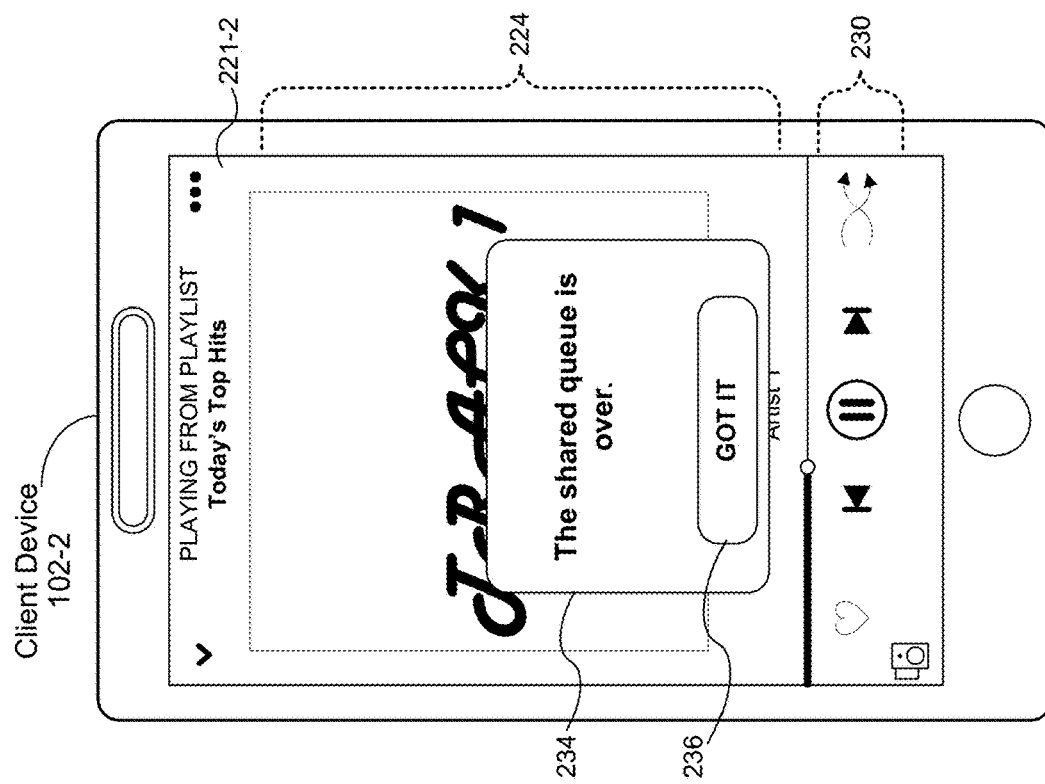
Figure 2G:
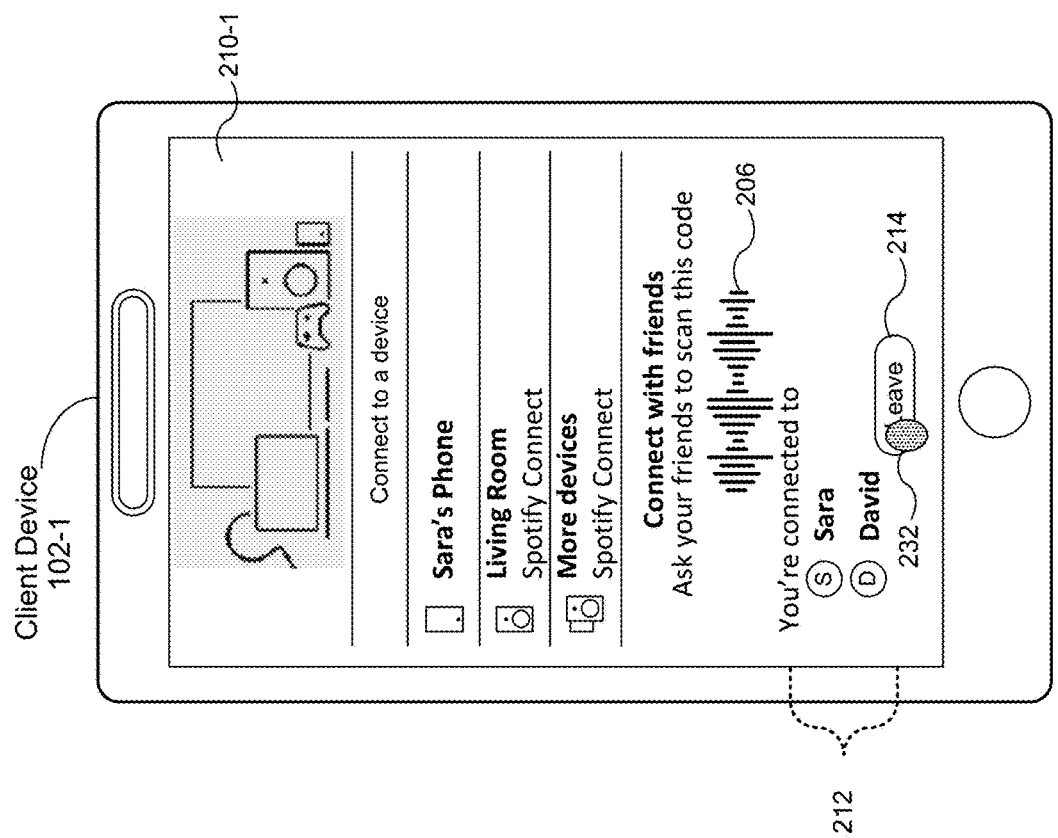

FIG. 2G illustrates a user input 232 detected by client device 102-1 (Sara's device) at a location corresponding to the "Leave" affordance 214. In some embodiments, because Sara is the host of the shared playback session, in response to receiving (e.g., at the server 104 and/or at client device 102-1) an indication of an input at the "Leave" affordance 214, the shared playback session ends.

In some embodiments, a client device 102-m joins the shared playback session hosted by client device 102-1 (e.g., Sara) after client device 102-2 (e.g., David) has joined the shared playback session. In some embodiments, when an indication of an input at the "Leave" affordance is received from a participant (e.g., not the host), on a respective participant client device, the shared playback session continues and the playback queue continues to be presented to the remaining users (e.g., the host and the remaining participants). For example, in response to receiving an indication of an input at the "Leave" affordance at client device 102-2 (e.g., David), client device 102-2 leaves the shared playback session (and is no longer connected to Sara and device 102-m). Because David was a participant (e.g., not the host) of the shared playback session, the shared playback queue continues to be presented to client device 102-1 (e.g., Sara) and client device 102-m. In some embodiments, after David has left the shared playback session, the device (e.g., server and/or device 102-m) receives an indication of an input at device 102-m to activate the "Leave" affordance. In some embodiments, in response to the input at device 102-m to "Leave," the shared playback session continues on host device 102-1 even though there are no additional participants. In some embodiments, in response to the input at participant device 102-m to "Leave," the shared playback session is terminated (e.g., by the server 104 and/or host device 102-1) because only host device 102-1 remained in the shared playback session.

In some embodiments, in response to the host leaving the shared playback session, the server system terminates the shared playback session and provides the users that remained in the shared playback session (e.g., user of device 102-2) with a notification 234 that the shared playback session is over, as illustrated in FIG. 2H. In some embodiments, the user of device 102-2 is enabled to dismiss the notification by selecting acknowledgement ("Got It") affordance 236. In some embodiments, after the shared playback session has been terminated (e.g., by the server system), the user of client device 102-2 chooses to continue to listen to the media content items that were included in the shared playback queue. For example, as shown in FIG. 2I, the user continues to listen to "Track 1" from "Session 1". In some embodiments, because the playback queue of session 1 is maintained on client device 102-2, client device 102-2 is enabled to initiate a second shared playback session that includes the playback queue of the shared playback session that was terminated. In some embodiments, the playback queue of session 1 is maintained on the media content server 104 (e.g., in addition to or instead of being stored on the client device). This way, any remaining users who want to continue consuming the shared playback queue after the host terminated the session are able to join a new (second) shared playback session that continues from the point in the queue at which the previous session ended. After the shared playback session is terminated, connection indication 228 (FIG. 2F) no longer indicates that other devices are connected to device 102-2 through a shared playback session. Client device 102-2 displays connection options 240 to, for example, allow the user of device 102-2 to connect to or change a presentation device.

Figure 2J:
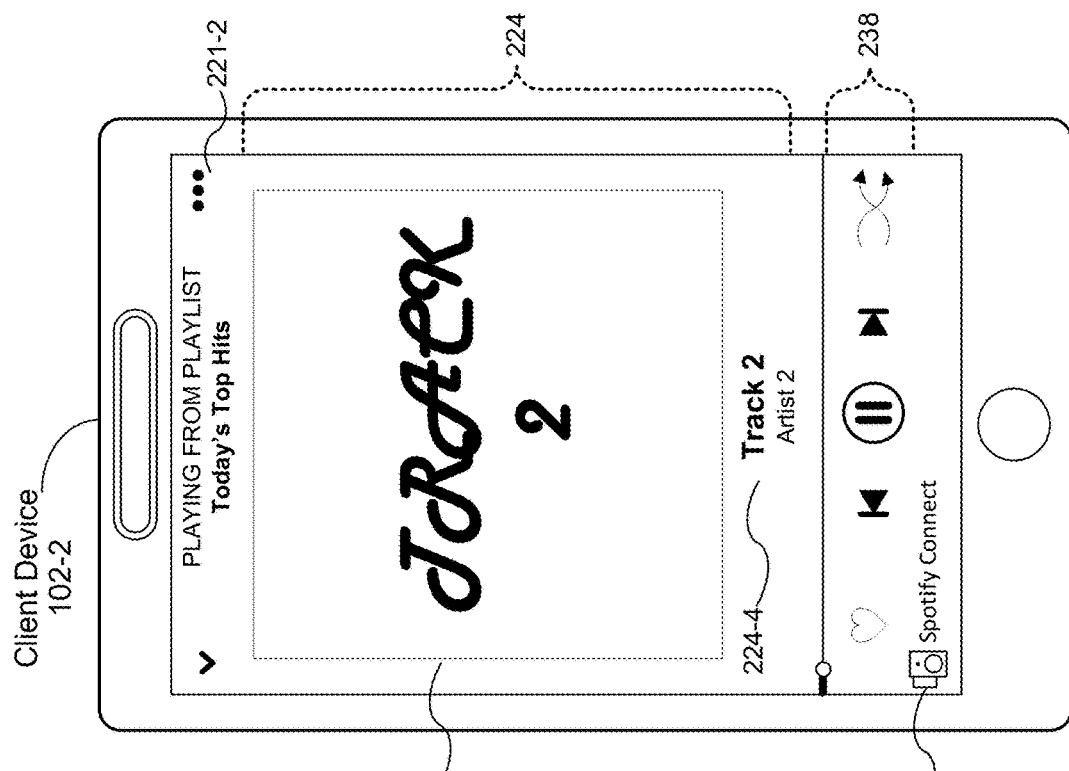
Figure 2I:
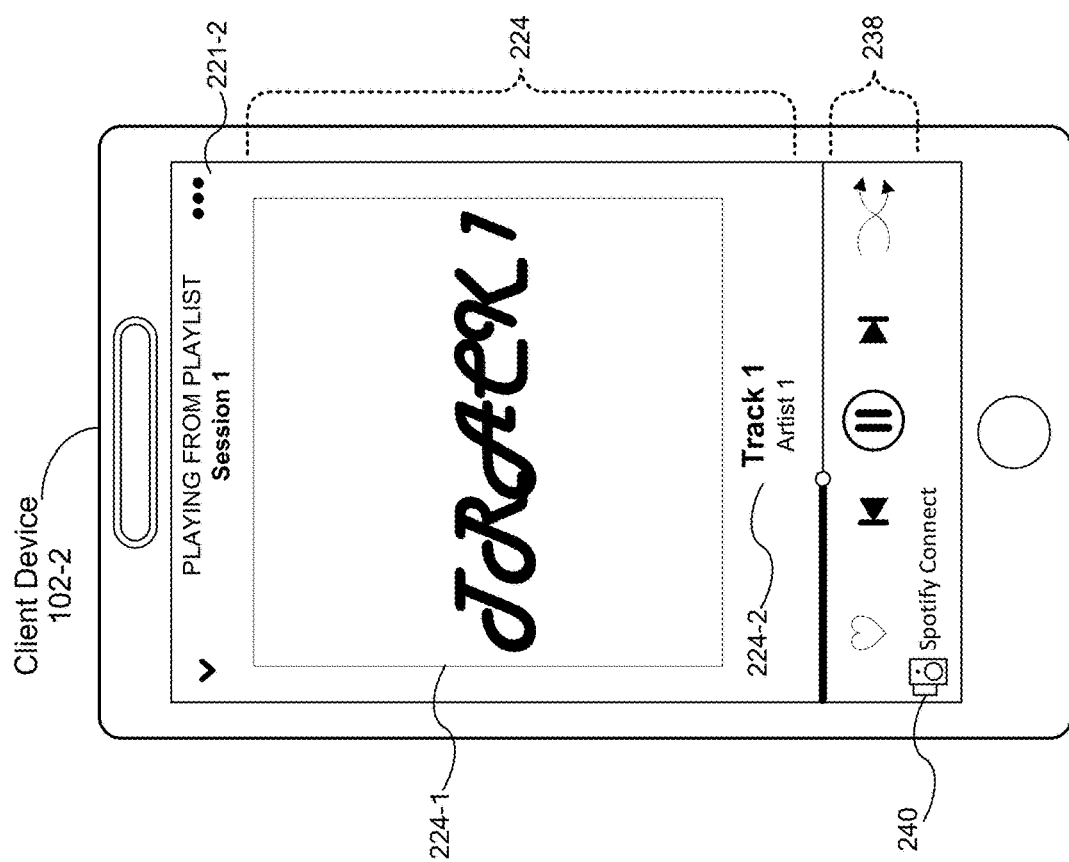

As shown in FIG. 2J, in some embodiments, in accordance with a termination that host device 102-1 has terminated the shared playback session, client device 102-2 ceases playback of the shared playback queue and initiates playback of the previously playing personal queue of the user of client device 102-2 (e.g., at a point in the personal queue that was playing when the user of device 102-2 joined the shared playback queue). For example, client device 102-2 is now playing "Track 2" indicated by information 224-3 and 224-4 from "Today's Top Hits" instead of continuing to play "Track 1" of the shared playback queue. In some embodiments, in response to the client device 102-2 selecting to return to the personal queue of the user, the previously shared playback queue (e.g., from Session 1) is released from storage (e.g., the shared playback queue for the shared playback session that had been terminated is cleared). In some embodiments, the client device resumes a previous personal queue that was streamed at the client device (e.g., David will resume listening to what was playing before joining Sara's shared playback session).

In some embodiments, rather than joining a shared listening session as described above, users can join shared listening sessions using the "frictionless" process described below with reference to FIGS. 3, and 5A-5B. In some circumstances, a host user has identified a participating user as a "trusted" user. In some embodiments, only a user that is trusted by another user is granted access to the other user's shared listening session without further intervention by the other user. Stated another way, in some embodiments, "frictionless" joining is only available to trusted users. In some embodiments, when a participating user has not been identified as a trusted user, the participating user may still join the shared listening session by, e.g., scanning a bar code or any of the other methods described above.

FIGS. 2K-2N illustrate examples of user interfaces for frictionless joining of a shared listening session. Various features of the user interfaces in FIGS. 2K-2N may be used instead of, or in conjunction with, the features of the user interfaces described above with reference to FIGS. 2A-2H.

Figure 2L:
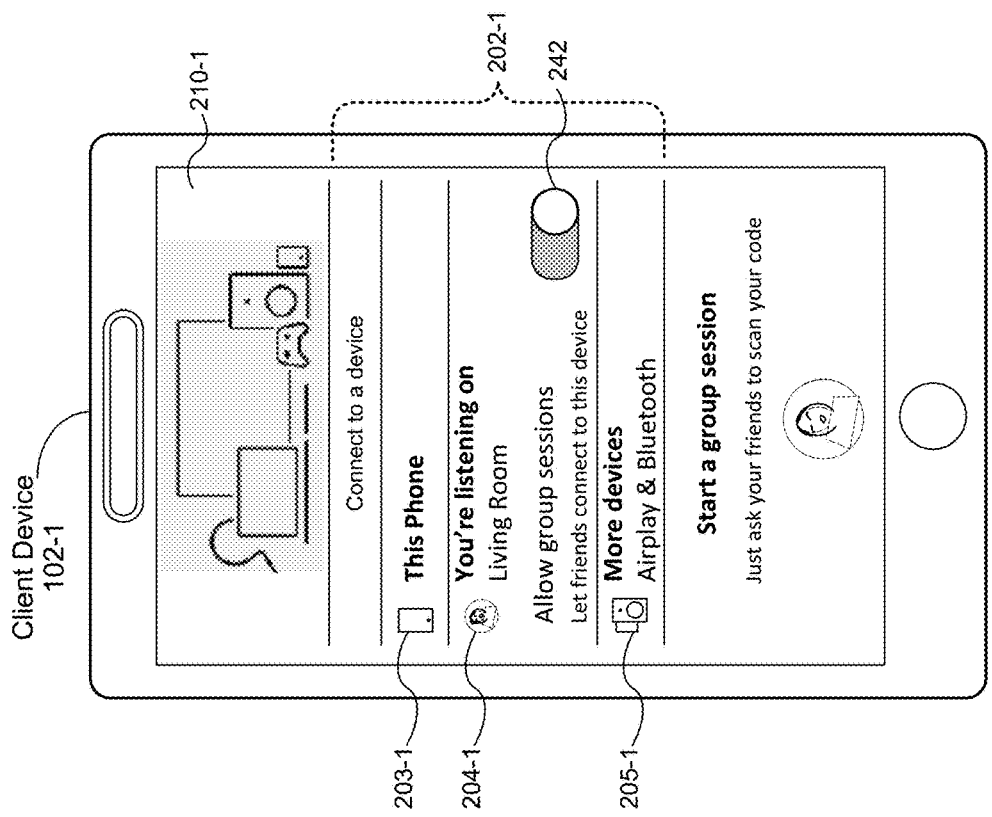
Figure 2K:
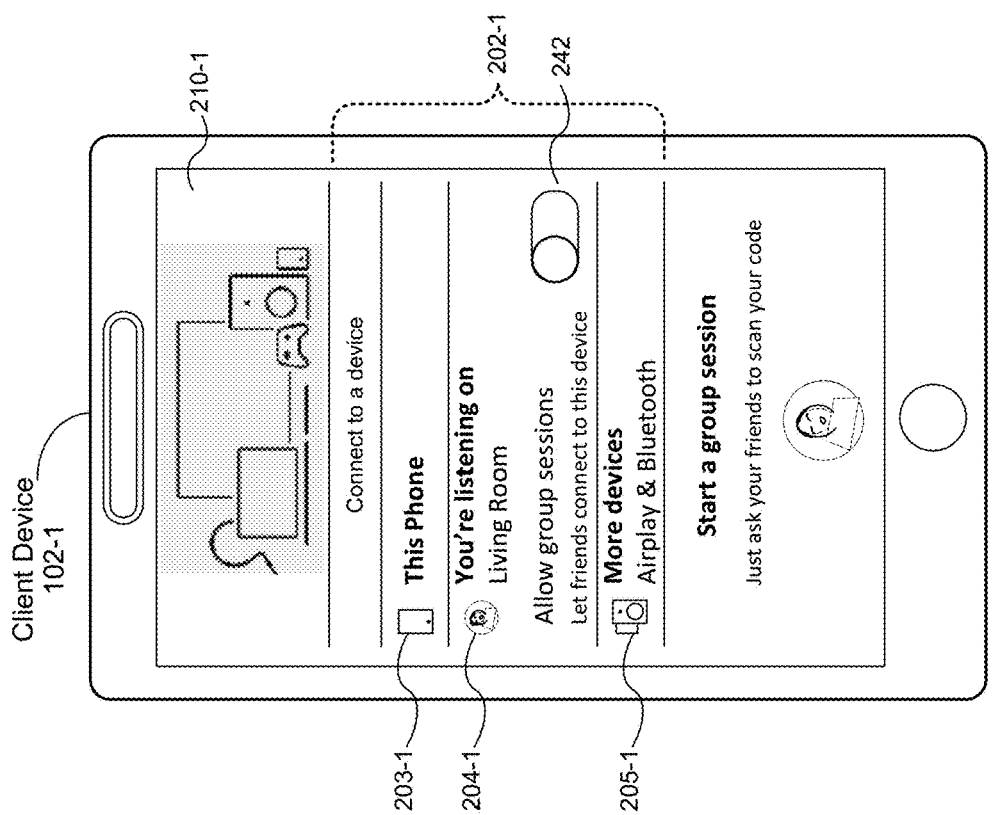

FIG. 2K-2L illustrate an example of a user interface 210-1 for activating shared listening sessions, displayed on client device 102-1 (e.g., the host, in this example). The graphical user interface 210-1 includes a device selection portion 202-1. Device selection portion 202-1 includes user interface objects corresponding to various presentation devices: "This iPhone" 203-1, "Living Room" 204-1, and "More devices" 205-1. In this example, the user of device has selected the living room speaker (e.g., "Living Room" 204-2) as the presentation device, and thus has the option of exposing the listening session on the living room speaker to other users. To that end, in some embodiments, an affordance 242 (e.g., a toggle switch) is provided, under whichever device is currently selected by the user of device 102-1 as the presentation device, to expose the listening session. Thus, in some embodiments, the user can expose the listening session on the current presentation device. In some embodiments, activating the shared listening session using affordance 242 allows other users to join the shared listening session using the frictionless joining methods described herein. In FIG. 2K, the affordance 242 is toggled off and the listening session is not exposed. In FIG. 2L, the affordance 242 is toggled on and the listening session is exposed.

Figure 2N:
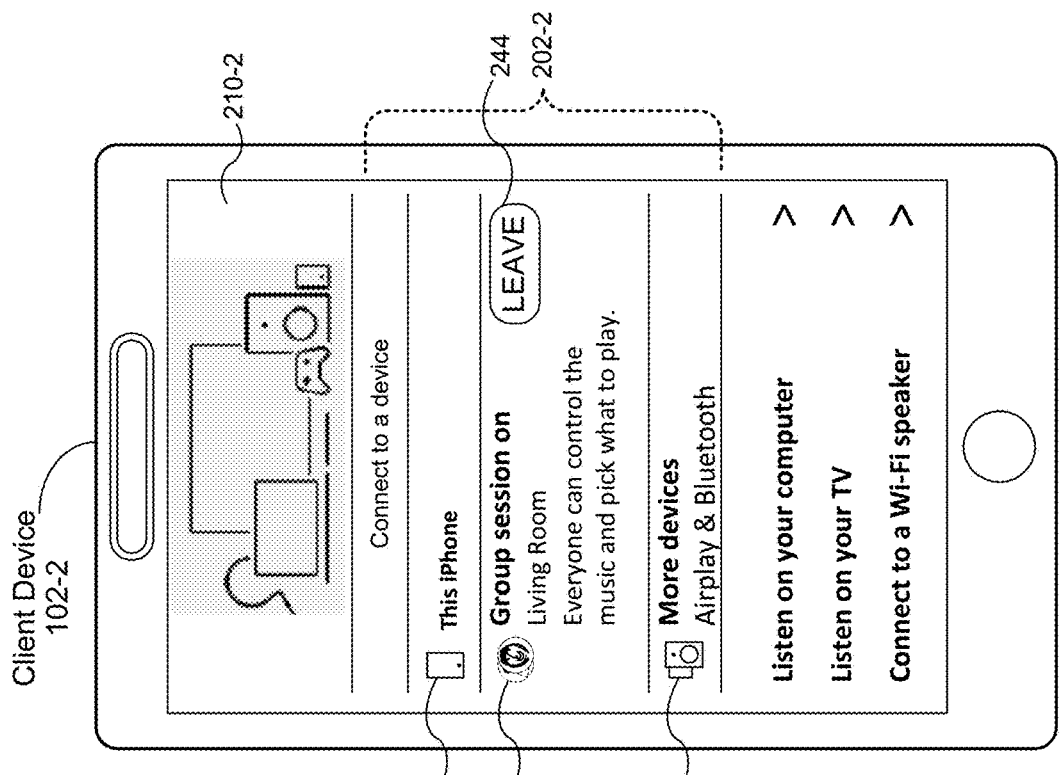
Figure 2M:
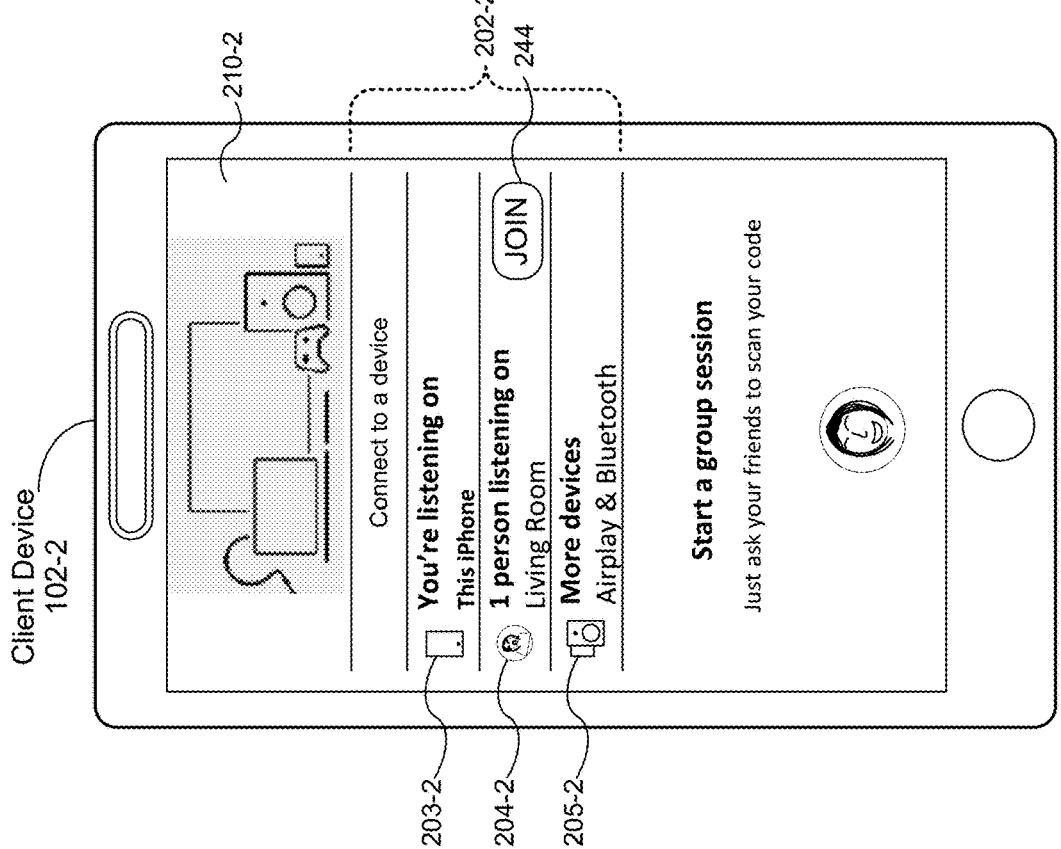

FIGS. 2M-2N illustrates an example of a user interface 210-2 for joining a shared listening sessions, displayed on client device 102-2 (e.g., the participant, in this example). The graphical user interface 210-2 includes a device selection portion 202-2. For example, device selection portion 202-2 includes user interface objects corresponding to various presentation devices: "This iPhone" 203-2, "Living Room" 204-2, and "More devices" 205-2. In this example, the living room speaker is already in use (e.g., by the user of the device 102-1) as a shared listening session. Thus, user interface 210-2 includes an affordance 244 for joining and/or leaving the shared listening session. Note that, in some embodiments, the device has recognized, without user intervention, that a shared listening session is active on the living room speaker (e.g., using method 500, FIGS. 5A-5B), and thus provided the affordance 244 to join and/or leave the shared listening session.

Figure 3:
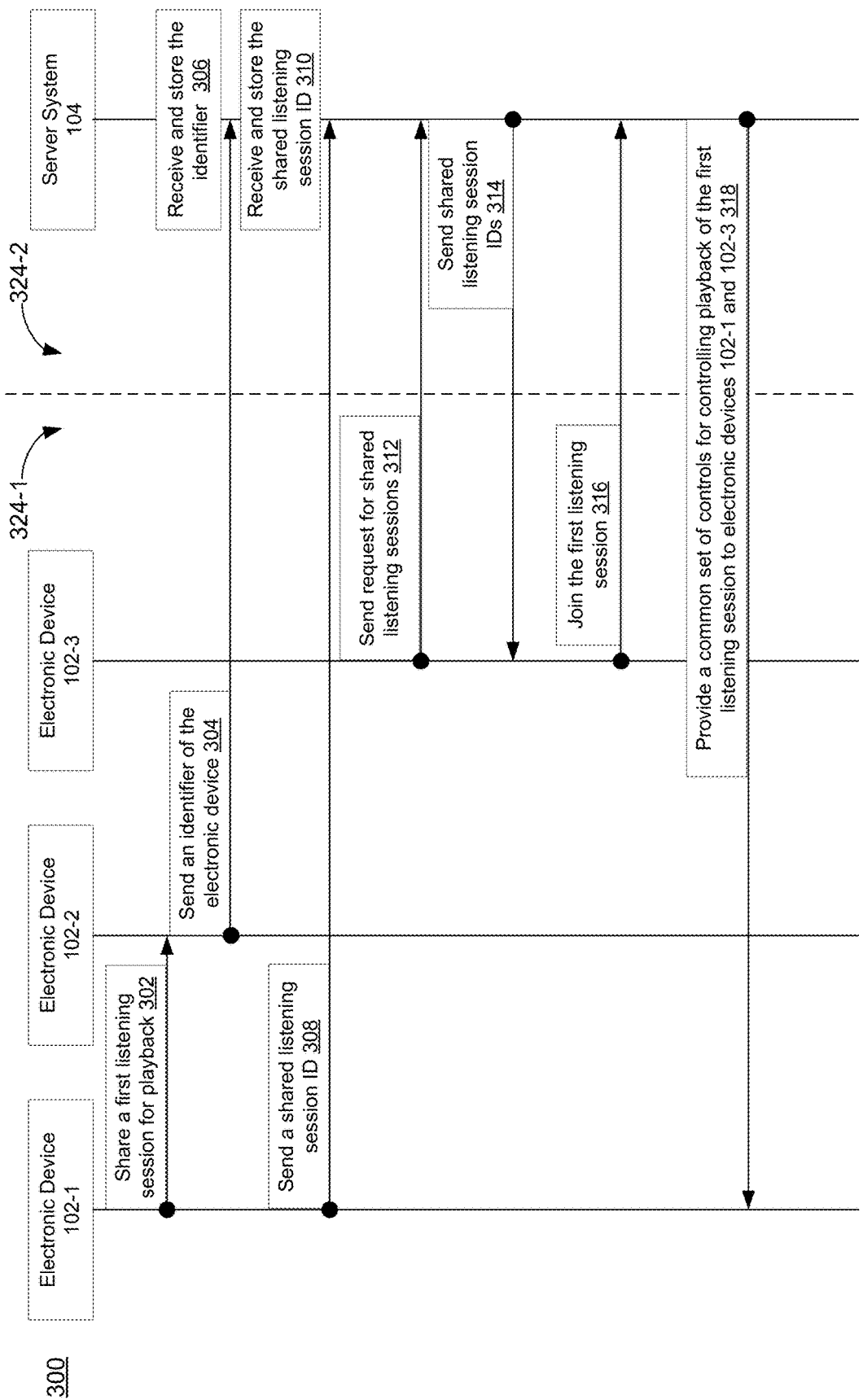
FIG. 3 is a flow diagram illustrating a method for frictionless joining of a listening session on a target device, in accordance with some embodiments

FIG. 3 is a flow diagram illustrating a method 300 for frictionless joining of a listening session on a target device, in accordance with some embodiments. Note that the target device may represent a group of devices (e.g., a group of speakers or two or more devices having different device types, for example, a speaker, television, and gaming console). For ease of explanation, method 300 is described as being performed at a system architecture 324 that is divided with a dotted line between a client portion 324-1 and a server portion 324-2.

In some embodiments, client portion 324-1 includes a plurality of electronic devices 102 (e.g., client devices). For example, the client portion 324-1 of system architecture 324 includes a first electronic device 102-1, a second electronic device 102-2, distinct from first electronic device 102-1 that includes a speaker, and a third electronic device 102-3.

In some circumstances, first electronic device 102-1 shares (302) a first listening session for playback on second electronic device 102-2. For example, first electronic device 102-1 may be a handheld electronic device and second electronic device 102-2 may be a living room speaker. Alternatively, first electronic device 102-1 may be a portable multifunction device (e.g., a smart phone) and second electronic device 102-2 may be integrated into a car (e.g., as part of the car's console, stereo, or infotainment system).

In some embodiments, in response to the session being initiated, a user identifier of a first user (e.g., the first user's account number) of the first electronic device 102-1 is transferred to the second electronic device 102-2 and to server system 104 (e.g., such that the first user is logged-into the second electronic device).

In some embodiments, the second electronic device 102-2 sends (304) an identifier of itself (e.g., an IMEI number) to the server system 104. In some embodiments, the second electronic device 102-2 sends the identifier in response to the first electronic device 102-1 sharing the listening session on the second electronic device 102-2. In some embodiments, the second electronic device 102-2 sends the identifier prior to the first electronic device 102-1 sharing the listening session (e.g., as part of a registration process). In some embodiments, the server system 104 receives (306) and stores the identifier of the second electronic device 102-2.

In some embodiments, the first electronic device 102-1 sends session information about the first listening session to the server system 104. In some embodiments, the session information (also called session status information) includes an indication that the session has been initiated (e.g., the server stores the session's status as "exposed"). In some embodiments, the first electronic device 102-1 sends (308) a shared listening session ID corresponding to the first listening session to the server system (e.g., a unique identifier for the shared listening session). In some embodiments, the unique identifier is a combination of the user identifier for the first user of the first electronic device 102-1 and the identifier of the second electronic device 102-2 (e.g., an IMEI identifier). In some embodiments, the server system 104 receives (310) and stores the shared listening session ID.

In some embodiments, prior to sharing the first listening session, the first user of the first electronic device 102-1 identifies a list of "trusted" users. The list of trusted users is sent to the server system 104 and stored there. Trusted users are users that may join the first user's shared listening sessions without intervention or confirmation by the first user at the time of the request to join such a shared listening session.

In some embodiments, when the third electronic device 102-3 is within the same proximity zone as the second electronic device 102-2 (e.g., the same WLAN network), the third electronic device "discovers" the second electronic device 102-2 (e.g., by proactively requesting device identifiers from local devices). To that end, in some embodiments, the third electronic device 102-3 performs a discovery process for discovering local devices that are in the same proximity zone as the third electronic device 102-3 (e.g., the same WLAN). In some embodiments, the third electronic device 102-3 periodically requests the device identifier for the second electronic device 102-2 (e.g., the discovery process for local devices is performed periodically). In some embodiments, the discovery process for local devices is perform upon the third electronic device 102-3's entry or joining of the proximity zone (e.g., upon joining the WLAN). In some embodiments, the discovery process for local devices is performed asynchronously with the request to join the shared listening session (described below).

In some embodiments, the third electronic device sends (312) a request for information about shared listening sessions that are currently available (e.g., exposed). In some embodiments, operation 312 is performed without user intervention. In some embodiments, the server system sends (314) one or more shared listening session IDs (e.g., sends a list of available shared listening sessions). In some embodiments, as discussed above, the session IDs are a combination of an identifier of a user that shared the listening session and an identifier of a device on which playback of the listening session is being provided (e.g., a speaker).

In some embodiments, the list of available shared listening sessions is presented to the user of the third electronic device 102-3. In response to selection of the first shared listening session, a request to join the first shared listening session (316) is sent from the third electronic device 102-3 to the server system 104.

In some embodiments, in response to the request to join the first shared listening session, the server system 104 provides (318) a common set of controls for controlling playback of the first listening session (e.g., the user of the third electronic device 102-3 joins the first listening session). In some embodiments, the common set of controls for controlling playback of the first listening session is provided in accordance with a determination that the user of the third electronic device 102-3 is a trusted user of the first user of the first electronic device 102-1. Note that there are any number of ways for the server system 104 to determine whether the user of the third electronic device 102-3 is a trusted user of the first user. For example, in some embodiments, at operation 314, the server system provides only identifiers of shared listening sessions that the user of the third electronic device 102-3 is, in fact, authorized to join. In some embodiments, in addition to the identifiers of the shared listening sessions, the server system 104 provides (at operation 314) a token that authorizes the third electronic device to join (e.g., a so-called join token). In some embodiments, the server system 104 provides (at operation 314) a list of all available shared listening sessions, and verifies, in response to the request at operation 316, that the user of the third electronic device 102-3 is trusted to join the first listening session.

Figure 4:
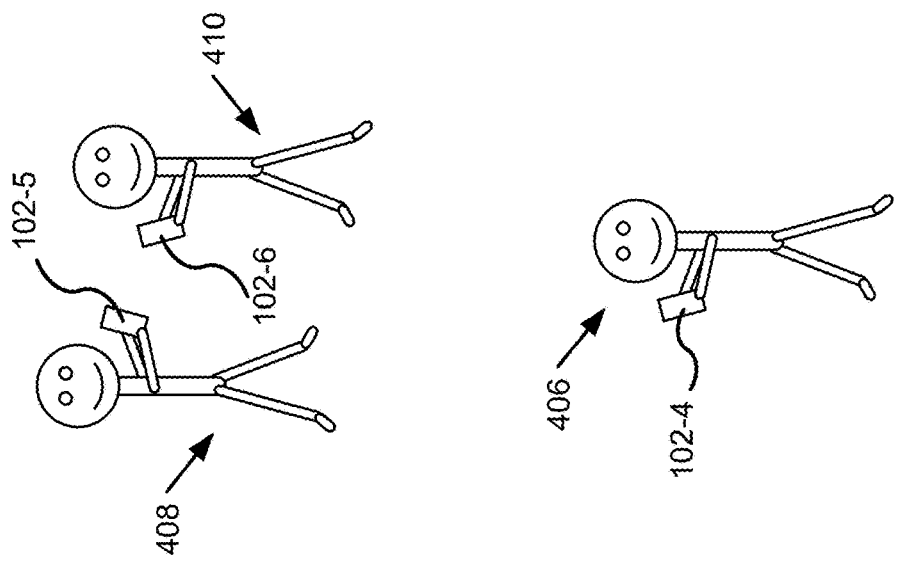
FIG. 4 illustrates an exemplary scenario of frictionless joining of a target device, in accordance with some embodiments.
Figure 4:
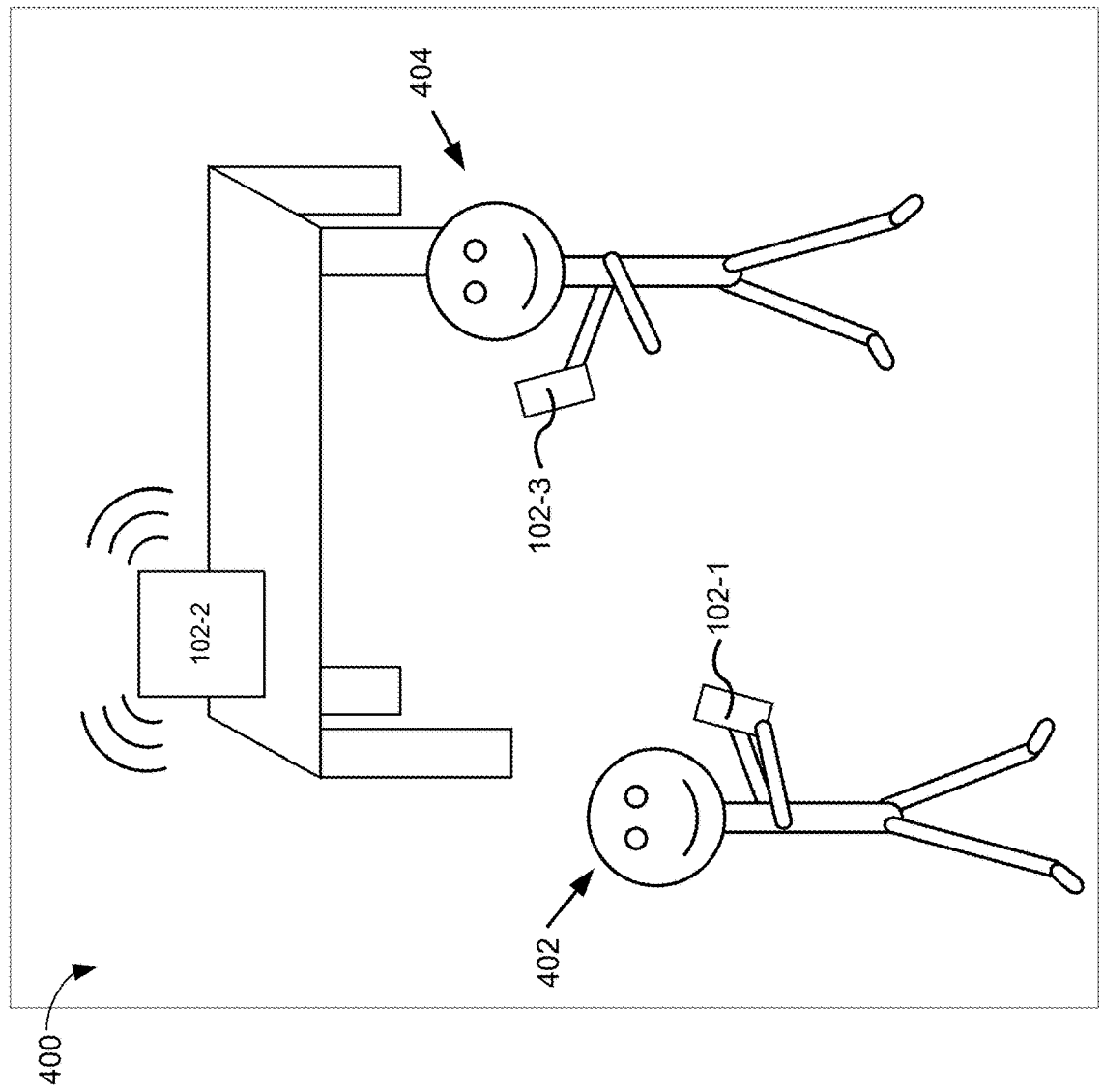

FIG. 4 is an exemplary diagram illustrating a scenario for frictionless joining of a listening session on a target device, in accordance with some embodiments. Multiple persons (e.g., person 402, 404, 406, 408, and 410) are interacting with their respective electronic devices (e.g., 102-1, 102-2, 102-4, 102-5, and 102-6). Persons 402 and 404 are within a boundary 400 (e.g., proximity zone), which also includes second electronic device 102-2 (e.g., a speaker). In some embodiments, person 404 wishes to share controls for presented media (e.g., to add songs to a playlist, change to a different radio station, increase or decrease the volume, etc.). To that end, person 402 using electronic device 102-1 has created a shared listening session and selected electronic device 102-2 (e.g., speaker device) to playback media from the shared listening session. Using methods 300 (described above) and/or 500 (described below), electronic device 102-3 can receive playback controls for the person 402's listening session, without intervention of person 402 at or after the time of the request to join. Persons outside of the boundary 400 (e.g., proximity zone) are not privy to the shared listening session.

Figure 5A:
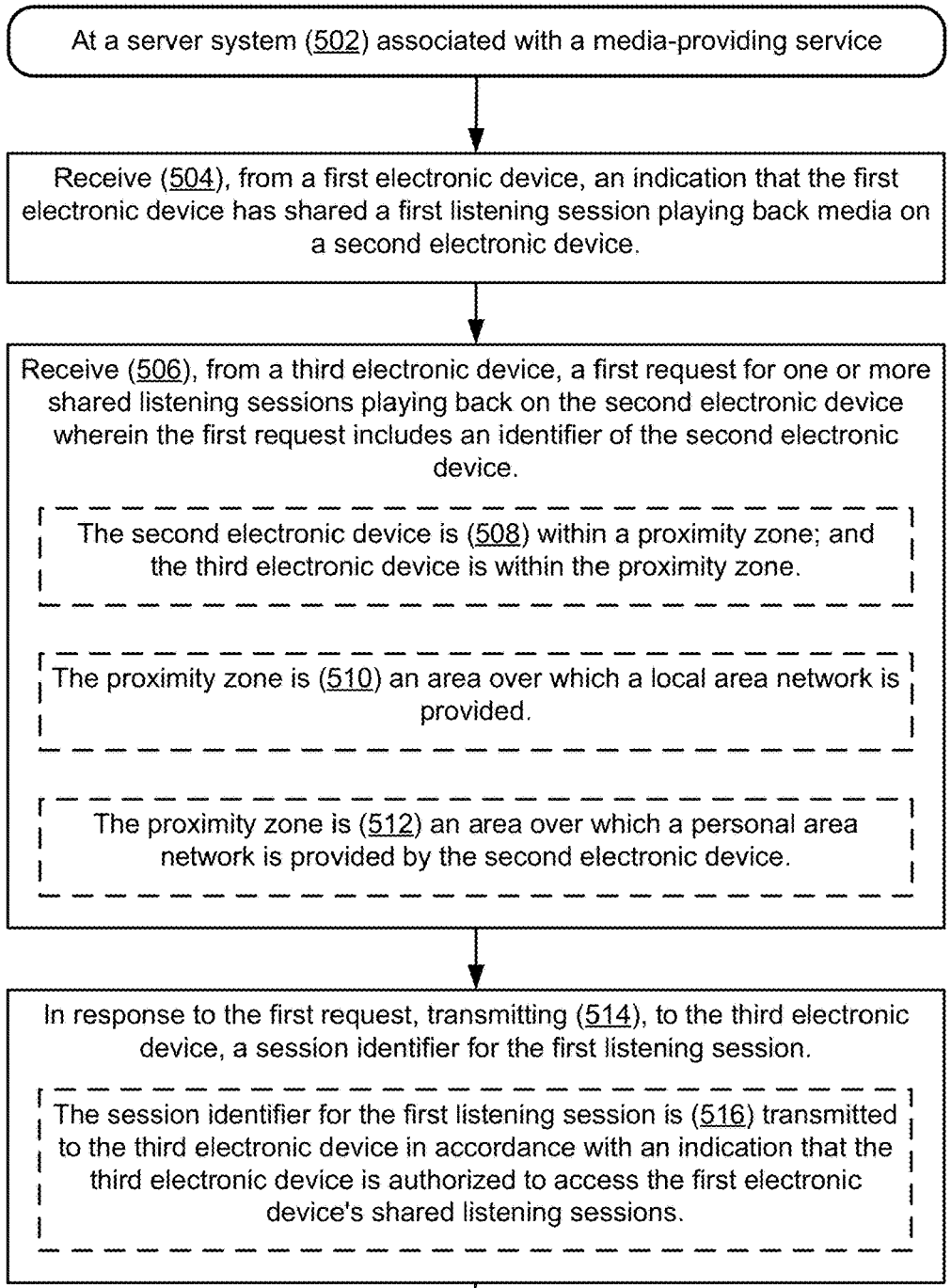
FIGS. 5A-5B are flow diagrams illustrating a method of providing frictionless joining of a shared listening session on a target device, in accordance with some embodiments.
Figure 5B:
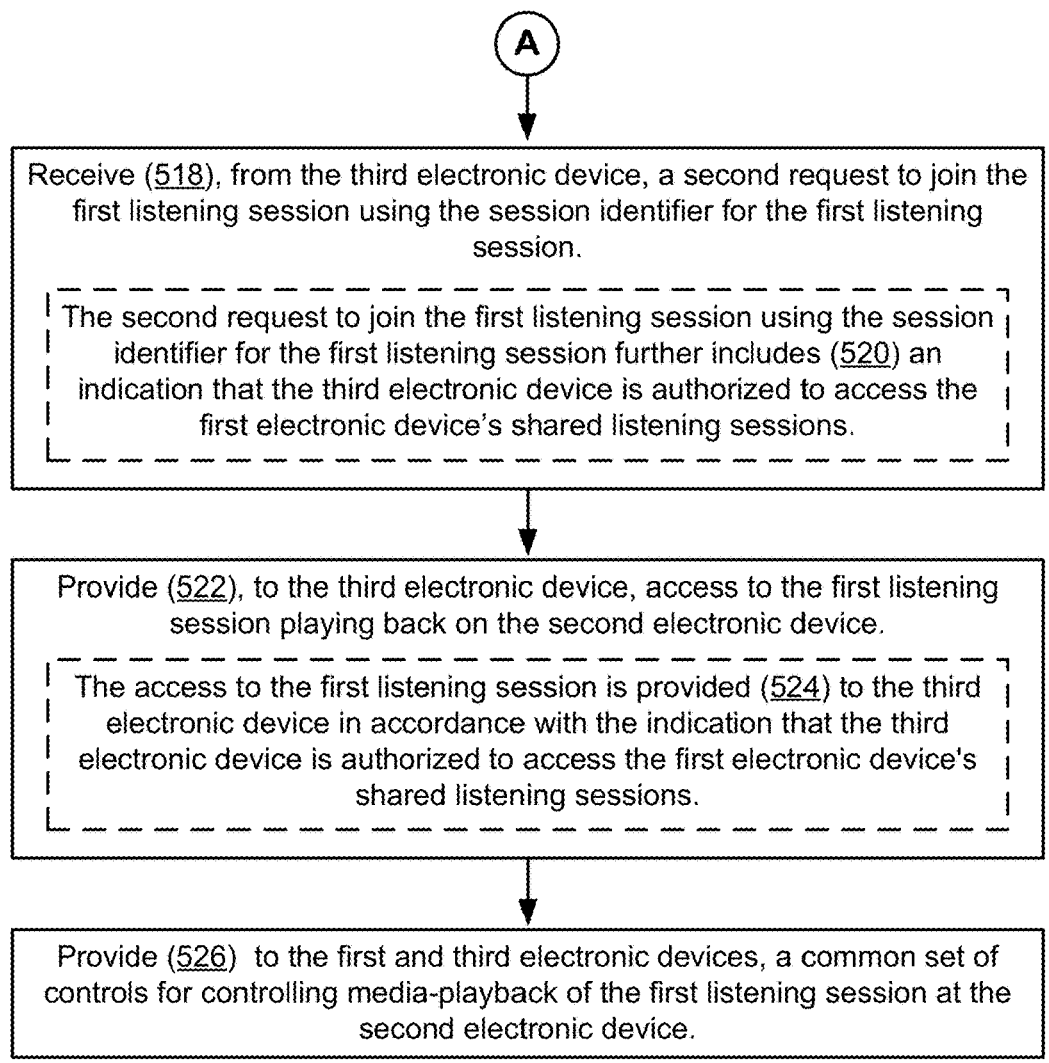

FIGS. 5A-5B are flow diagrams illustrating a method of joining a listening session on a target device, in accordance with some embodiments. Method 500 may be performed (502) at a server system (e.g., media content provider server 104, FIG. 7), the server system having one or more processors and memory storing instructions for execution by the one or more processors. In some embodiments, the method 500 is performed by executing instructions stored in the memory (e.g., memory 706, FIG. 7) of the server system. In some embodiments, the method 500 is performed by a combination of the server system (e.g., including media content provider server 104 and/or CDN 106) and a client device (e.g., electronic device 102-1, FIG. 6).

In some embodiments, certain operations described below are performed by a client device (e.g., a first electronic device, a second electronic device, and/or a third electronic device). In some embodiments, these operations are executed or facilitated by a Web application running on the client device (e.g., a JavaScript application or an HTML application running on a browser, executed at the client device). Thus, in some embodiments, portions of these operations are split between the client device (e.g., the web browser) and a server system in communication with the client device (e.g., via the web browser). In various embodiments, the server system can be the same server system or a different server system than the server system that performs method 500.

Briefly, in some embodiments, method 500 is performed in a system comprising: a first electronic device (e.g., a client device of a host user); a second electronic device playing a listening session controlled by the first electronic device; and a third electronic device (e.g., a client device of a participant user). In some embodiments, in response to the third electronic device entering a vicinity of the second electronic device (e.g. the proximity zone as described below, such as the same WLAN, Bluetooth, NFC, etc., of the second device), the third electronic device automatically receives a device identifier of the second electronic device from said second electronic device. In response to receiving the device identifier, the third electronic device automatically sends a request comprising the device identifier to a server system. In some embodiments, using of the received device identifier, the server system determines a session identifier of the listening session being played at the second electronic device and transmitting the session identifier to the third electronic device. In some embodiments, using the received session identifier, the third electronic device automatically joins the listening session and displays playback controls for the listening session on a graphical user interface of the third electronic device.

Method 500 provides technical advantages and improves the client and server computers described herein by simplifying the user-machine interface as it relates to accessing and controlling media playback on remote devices by several users. In particular, conventional methods of sharing listening sessions require, for example, participant users to remember device "friendly names" and/or require host users to expressly approve a participant joining. By allowing "frictionless" joining of a listening session on a target device by multiple users, as described below, the method 500 reduces or eliminates some of the requirements of convention methods, thus reducing the complexity involved in accessing and controlling a remote device. For example, as described with reference to FIGS. 2K-2N, after exposing a listening session, in some embodiments, no further inputs are required at the host device to allow certain users (e.g., trusted user), to join a shared listening session, thus reducing the number and complexity of user inputs at the host device and saving battery power. In this manner, method 500 increases user satisfaction and prolongs battery life of mobile devices.

Referring now to FIG. 5A, in performing the method 500, the server system (e.g., media content server 104) receives (504), from a first electronic device, an indication that the first electronic device has shared a first listening session (e.g., listening session module 716, FIG. 7) playing back media on a second electronic device. For example, the server system receives an indication that a user of device 102-1 has toggled affordance 244 into an "on" position (FIGS. 2K-2L). In some embodiments, the server system receives an indication that a first user of the first electronic device has selected a speaker to be used for media playback. In some embodiments, in a shared listening session, at a minimum, information about the same media playback (e.g., media played back on a single device) is provided to each session member's device. In some embodiments or circumstances, in a shared listening session, control over the same media playback is provided to a plurality of session member's devices (e.g., each session member's device).

In some embodiments, the second electronic device is a speaker. In some embodiments, the second electronic device is a group of devices. In some embodiments, the group of devices is identified by a group identifier (e.g., the identifier of the second electronic device, operation 506, is a group identifier). In some embodiments, the group of devices includes a set of one or more speakers. In some embodiments, the group of devices includes a display. In some embodiments, a portion of content of the first listening session (e.g., of a first media content type, such as audio) is provided on a first device of the group of devices, and a second portion, distinct from the first portion (e.g., of a second media content type, distinct from the first media content type, such as video) is provided on a second device of the group of devices. For example, in some embodiments, audio is provided by the set of one or more speakers and lyrics and/or accompanying video is provided by the display.

In some embodiments, the server system receives (506) from a third electronic device, a first request for one or more shared listening sessions playing back on the second electronic device wherein the first request includes an identifier of the second electronic device. In some embodiments, only one shared listening session can be active on the second electronic device at any given time (e.g., the first request is a request for at most a single shared listening session playing back on the second electronic device). In some embodiments, the identifier of the second electronic device is a device ID. In some embodiments, the third electronic device obtained the device ID for the second electronic device through a local discovery process, as described above with reference to method 300. In some embodiments, having the third electronic device provide, to the server system, the device identifiers of local devices facilitates the local device discovery processes described herein, which in turn facilitates the display of the user interfaces shown in FIGS. 2M-2N. Because very little, if any, user intervention is required prior to offering the user of the third electronic device (e.g., the participant device) the option to join a shared listening session, these features reduce the number and complexity of user inputs at the participant device and save battery power at the participant device.

In some embodiments, prior to receiving the first request, the server system receives an indication from the first electronic device that the third electronic device (or a user of the third device) is authorized to access the first electronic device's shared listening sessions. For example, a user of the first electronic device is friends with a user of the third electronic device. The users may mutually add each other and/or each other's electronic devices as trusted devices. In some embodiments, the trust process is non-reciprocal: the first user does not become a trusted user of the user of the third electronic device simply because the first user indicates that she trusts the user of the third electronic device. In some embodiments, receiving an indication that the third electronic device is authorized to join the first electronic device's listening sessions reduces the number and complexity of user inputs at the host device, because the user of the host device does not have to approve repeated requests to join listening sessions, thus saving battery power at the host device.

In some embodiments, the server system receives a first listening session ID for the first listening session. In some embodiments, the first listening session ID is generated by the first electronic device. In some embodiments, the first listening session ID is generated by the server system.

In some embodiments, the second electronic device is (508) within a proximity zone and the third electronic device is within the proximity zone (e.g., proximity zone module 720). In some embodiments, the proximity zone is (510) a physical area over which a local area network is provided. In some embodiments, the proximity zone is (512) an area over which a personal area network is provided by the second electronic device. For example, the proximity zone is an area within a WLAN connection. In another example, the proximity zone is a BLUETOOTH range of the second electronic device. In another example, the proximity zone is a physical range over which audio from the second electronic device is provided (e.g., the local discovery process uses watermarked audio provided by the second electronic device, where the audio is part of the shared listening session). In some embodiments or circumstances, the first electronic device is not in the proximity zone (e.g., the third electronic device can join the first electronic device's shared listening session based on a determination that the user of the third electronic device is trusted by the user of the first electronic device). Allowing users within the same proximity zone to avail themselves of the frictionless joining methods described herein promotes the use of a local device discovery process (e.g., through which the joining user can discover devices with shared listening sessions), which improves such user's devices by improving the human-machine interface and saving battery power on mobile devices. In some embodiments, as shown with reference to FIGS. 2M-2N, allowing devices within the same proximity zone to join shared listening sessions in a frictionless manner reduces the number and complexity of user inputs at the participant device, by allowing the participant device to discover shared listening sessions without user intervention, thus saving battery power at the participant device.

In response to the first request, the server system transmits (514), to the third electronic device, a session identifier for the first listening session. In some embodiments, the session identifier is a unique identifier for the particular session. In some embodiments, the session identifier for the first listening session is (516) transmitted to the third electronic device in accordance with an indication that the third electronic device is authorized to access the first electronic device's shared listening sessions (e.g., the server system provides the third electronic device with a list of only those shared listening sessions that the third electronic device is authorized to join). In some embodiments, the session identifier includes other information (other than identifying information) about the first listening session. For example, in some embodiments, the session identifier includes information about a lifetime of the shared listening session (e.g., the third electronic device's permission to join the shared listening session is valid for one hour).

The method 500 continues at FIG. 5B. The server system receives (518), from the third electronic device, a second request to join the first listening session using the session identifier for the first listening session (note here that the term "second request" is merely meant to distinguish from the "first request" mentioned above). In some embodiments, the third electronic device sends the second request in response to a user input to join the first listening session. In some embodiments, the second request to join the first listening session using the session identifier for the first listening session further includes (520) an indication that the third electronic device is authorized to access the first electronic device's shared listening sessions (e.g., a so-called "join token"). Note that operations 514-518 describe a multi-step process whereby the server system receives device identifiers of, e.g., locally discovered devices and reports back to the requesting client device a list of active shared listening sessions, allowing the user of the third electronic device to select a shared listening session. This multi-step process reduces the number and complexity of user inputs at participant device because the discovery of shared listening sessions is handled without user intervention between the third electronic device and the server system. This process also reduces the number and complexity of inputs at the host device, because, after initially exposing a listening session, in some embodiments, no further inputs are required at the host device to approve certain users joining the listening session (e.g., trusted users). By reducing the number and complexity of inputs at both the host and participant devices, these methods save battery power.

The server system provides (522), to the third electronic device, access to the first listening session playing back on the second electronic device. In some embodiments, the access to the first listening session is provided (524) to the third electronic device in accordance with the indication that the third electronic device is authorized to access the first electronic device's shared listening sessions.

The server system provides (526) to the first and third electronic devices, a common set of controls for controlling media-playback of the first listening session at the second electronic device. In some embodiments, the common set of controls include controls that were previously provided to the first electronic device. In some embodiments, common set of controls is a subset of the controls available to the first electronic device. In some embodiments, the server system 104 provides additional controls that are not available to the third electronic device. In some embodiments, the third electronic device is not provided with controls for controlling media-playback of the first listening session (e.g., is restricted to being a passive listener). In some embodiments, the host (e.g., the first electronic device) authorizes the third electronic device to receive the common set of controls. In some embodiments, operations 524 and 526 are combined.

Note that various operations of method 500 may be omitted in accordance with some embodiments.

Further, in some embodiments, in some embodiments, a method is performed at a client device (e.g., the third electronic device) determines (e.g., discovers), without user intervention, a device identifier for a second electronic device. The client device transmits, from a server system (e.g., the server system described with reference to method 500), a first request for one or more shared listening sessions playing back on the second electronic device wherein the first request includes an identifier of the second electronic device. The client device receives, without user intervention, a response to the first request that includes a session identifier for a first listening session, wherein the first listening session is a shared listening session (e.g., exposed by another user, as described above with reference to method 500). The client device transmits a second request to join the first listening session using the session identifier for the first listening session. After receiving authorization to join the first listening session, the client device displays a user interface for the first listening session that includes a common set of controls (e.g., shared with other users of the first listening session) for controlling media-playback of the first listening session at the second electronic device.

In some embodiments, the method includes any of the features of method 500 (e.g., from the perspective of the participant client device). In some embodiments, instructions for performing the method (e.g., at an electronic device with one or more processors and memory) are stored in a non-transitory computer-readable storage medium. In some embodiments, the method is performed at an electronic device that includes one or more processors and memory, wherein the memory stores instructions for performing the method.

Although FIGS. 5A-5B illustrate a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

Figure 6:
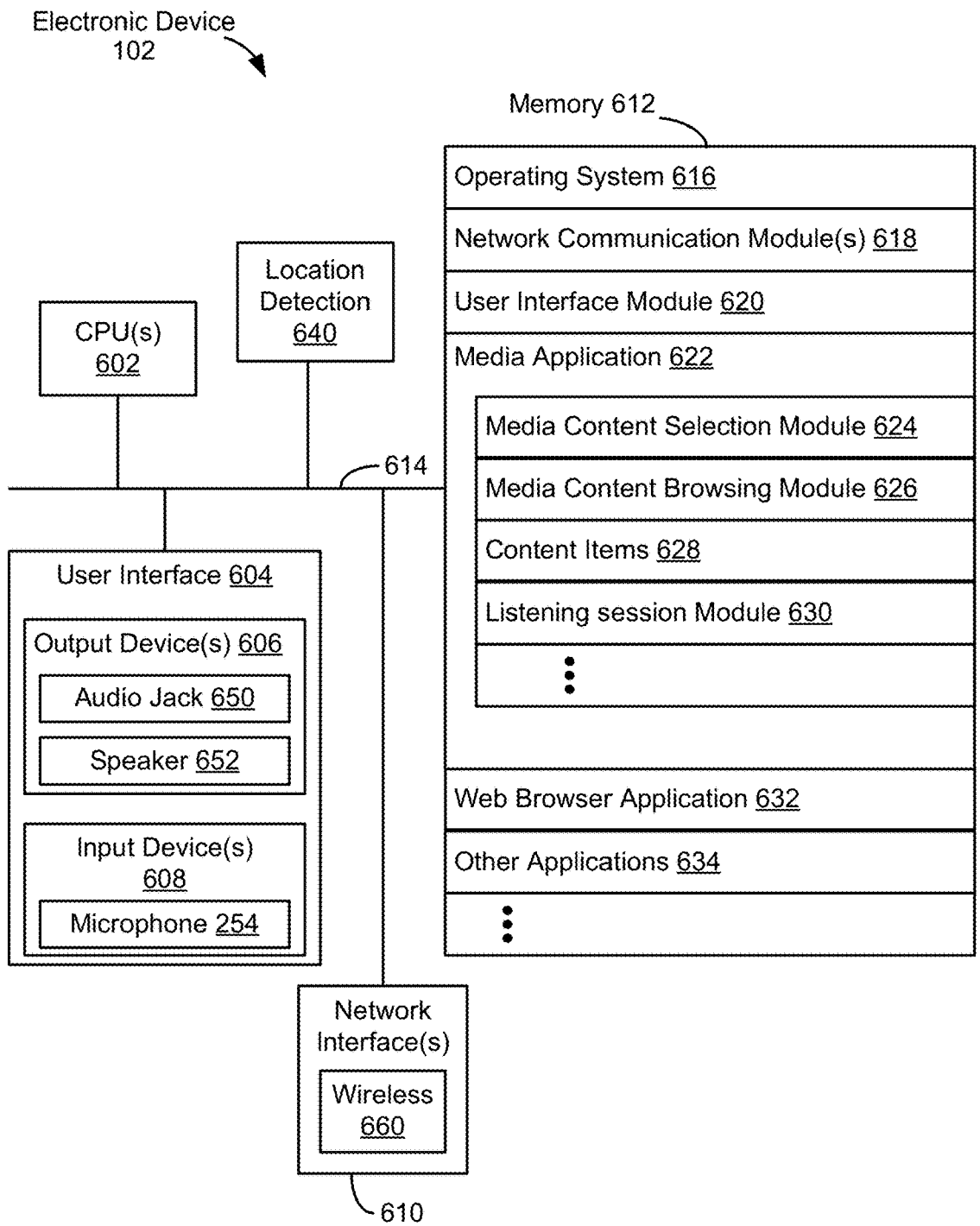
FIG. 6 is a block diagram illustrating a client device, in accordance with some embodiments.

FIG. 6 is a block diagram illustrating a client device 102 (e.g., client device 102-1 and/or client device 102-m, FIG. 1) in accordance with some embodiments. The client device 102 includes one or more central processing units (CPU(s), i.e., processors or cores) 602, one or more network (or other communications) interfaces 610, memory 612, and one or more communication buses 614 for interconnecting these components. The communication buses 614 optionally include circuitry (sometimes called a chipset) that interconnects and controls communications between system components.

The client device 102 includes a user interface 604, including output device(s) 606 and input device(s) 608. In some embodiments, the input devices 608 include a keyboard, mouse, or track pad. Alternatively, or in addition, in some embodiments, the user interface 604 includes a display device that includes a touch-sensitive surface, in which case the display device is a touch-sensitive display. "User input," as described herein, may refer to a contact detected with a touch-sensitive display and/or an input by an input device 608. In some embodiments, the output devices (e.g., output device(s) 606) include a speaker 652 (e.g., speakerphone device) and/or an audio jack 650 (or other physical output connection port) for connecting to speakers, earphones, headphones, or other external listening devices. Furthermore, some client devices 102 use a microphone and voice recognition device to supplement or replace the keyboard. Optionally, the client device 102 includes an audio input device (e.g., a microphone) to capture audio (e.g., speech from a user).

Optionally, the client device 102 includes a location-detection device 640, such as a global navigation satellite system (GNSS) (e.g., GPS (global positioning system), GLONASS, Galileo, BeiDou) or other geo-location receiver, and/or location-detection software for determining the location of the client device 102 (e.g., module for finding a position of the client device 102 using trilateration of measured signal strengths for nearby devices).

In some embodiments, the one or more network interfaces 610 include wireless and/or wired interfaces for receiving data from and/or transmitting data to other client devices 102, media presentations systems 108, a media content server 104, and/or other devices or systems. In some embodiments, data communications are carried out using any of a variety of custom or standard wireless protocols (e.g., NFC, RFID, IEEE 802.15.4, Wi-Fi, ZigBee, 6LoW-PAN, Thread, Z-Wave, Bluetooth, ISA100.11a, WirelessHART, MiWi, etc.). Furthermore, in some embodiments, data communications are carried out using any of a variety of custom or standard wired protocols (e.g., USB, Firewire, Ethernet, etc.). For example, the one or more network interfaces 610 include a wireless interface 660 for enabling wireless data communications with other client devices 102, media presentations systems 108, and/or or other wireless (e.g., Bluetooth-compatible) devices (e.g., for streaming audio data to the media presentations system 108 of an automobile). Furthermore, in some embodiments, the wireless interface 660 (or a different communications interface of the one or more network interfaces 610) enables data communications with other WLAN-compatible devices (e.g., a media presentations system 108) and/or the media content server 104 (via the one or more network(s) 112, FIG. 1).

In some embodiments, client device 102 includes one or more sensors including, but not limited to, accelerometers, gyroscopes, compasses, magnetometer, light sensors, near field communication transceivers, barometers, humidity sensors, temperature sensors, proximity sensors, range finders, and/or other sensors/devices for sensing and measuring various environmental conditions.

Memory 612 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 612 may optionally include one or more storage devices remotely located from the CPU(s) 602. Memory 612, or alternately, the non-volatile memory solid-state storage devices within memory 612, includes a non-transitory computer-readable storage medium. In some embodiments, memory 612 or the non-transitory computer-readable storage medium of memory 612 stores the following programs, modules, and data structures, or a subset or superset thereof:

- an operating system 616 that includes procedures for handling various basic system services and for performing hardware-dependent tasks;
- network communication module(s) 618 for connecting the client device 102 to other computing devices (e.g., media presentation systems 108, media content server 104, and/or other client devices) via the one or more network interface(s) 610 (wired or wireless) connected to one or more network(s) 112;
- a user interface module 620 that receives commands and/or inputs from a user via the user interface 604 (e.g., from the input devices 608) and provides outputs for playback and/or display on the user interface 604 (e.g., the output devices 606);
- a media application 622 (e.g., an application associated with and for accessing a content (i.e., media-providing) service provided by a media content provider such as media content server 104, including a media player, a streaming media application, or any other appropriate application or component of an application) for browsing, receiving, processing, presenting, and requesting playback of media (e.g., media items). The media application 622 is also used to monitor, store, and/or transmit (e.g., to media content server 104) data associated with user behavior. The media application 622 may include a content-personalization module (e.g., analogous to the content personalization module 524, FIG. 5) and also includes the following modules (or sets of instructions), or a subset or superset thereof:
    - an authentication module 624 for sending authentication tokens corresponding to one or more media presentation systems associated with the client device 102 (e.g., one or more of the media presentation systems 108 from FIG. 1), receiving authentication tokens from other devices, and/or generating authentication tokens for media presentation systems associated with client device 102;

media content browsing module 626 for providing controls and/or user interfaces enabling a user to navigate, select for playback, and otherwise control or interact with media content, whether the media content is stored or played locally or remotely;

a content items module 628 for storing media items for playback, including storing a playback queue such as the playlist shared during a listening session; and a listening session module 630 for generating and maintaining a listening session during playback of one or more media content items. The listening session module 630 may additionally or alternatively monitor permissions and maintenance of shared listening sessions across one or more users and/or user devices (e.g., electronic devices).

a web browser application 632 (e.g., Internet Explorer or Edge by Microsoft, Firefox by Mozilla, Safari by Apple, or Chrome by Google) for accessing, viewing, and interacting with web sites; and other applications 634, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support.

In some embodiments, the media presentation system 108 is a type of client device 102, and includes some or all of the same components, modules, and sub-modules as described above in FIG. 6 with respect to the client device 102.

Figure 7:
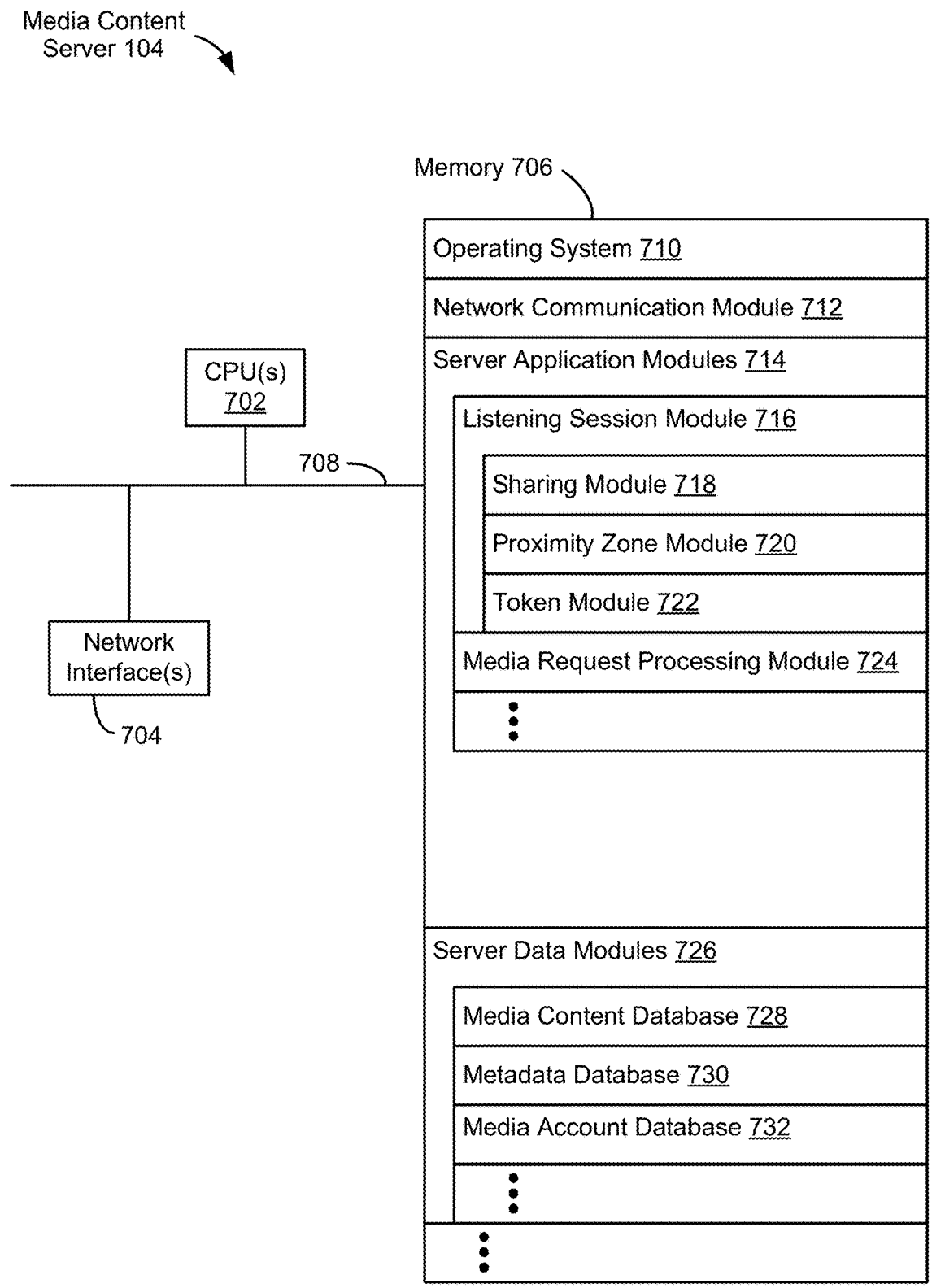
FIG. 7 is a block diagram illustrating a media content provider server, in accordance with some embodiments.

FIG. 7 is a block diagram illustrating a media content server 104 in accordance with some embodiments. The media content server 104 typically includes one or more central processing units/cores (CPUs) 702, one or more network interfaces 704, memory 706, and one or more communication buses 708 for interconnecting these components.

Memory 706 includes high-speed random access memory, such as DRAM, SRAM, DDR RAM, or other random access solid-state memory devices; and may include non-volatile memory, such as one or more magnetic disk storage devices, optical disk storage devices, flash memory devices, or other non-volatile solid-state storage devices. Memory 706, optionally, includes one or more storage devices remotely located from one or more CPUs 702. Memory 706, or, alternatively, the non-volatile solid-state memory device(s) within memory 706, includes a non-transitory computer-readable storage medium. In some embodiments, memory 706, or the non-transitory computer-readable storage medium of memory 706, stores the following programs, modules and data structures, or a subset or superset thereof:

an operating system 710 that includes procedures for handling various basic system services and for performing hardware-dependent tasks;

a network communication module 712 that is used for connecting the media content server 104 to other computing devices via one or more network interfaces 704 (wired or wireless) connected to one or more networks 112;

one or more server application modules 714 for performing various functions with respect to providing and managing a content service, the server application modules 714 including, but not limited to, one or more of:

a listening session module 716 for managing one or more listening sessions, the listening session module 716 including, but not limited to, one or more of:

a sharing module 718 for performing various functions with respect to receiving and granting permissions to access a shared listening session;

a proximity zone module 720 for determining, authenticating, verifying, and granting access to shared listening devices based on a location of one or more electronic devices;

a token module 722 for generating authentication tokens permitting use of media presentation systems 108 and for verifying that an authentication token is valid (e.g., has not yet expired or has not yet been revoked); and a media request processing module 724 for processing requests for media content and facilitating access to requested media items by client devices (e.g., the client device 102) including, optionally, streaming media content to such devices and/or to one or more media presentation systems 108;

one or more server data module(s) 726 for handling the storage of and access to media items and metadata relating to the media items; in some embodiments, the one or more server data module(s) 726 include:

a media content database 728 for storing media items (e.g., audio files, video files, text files, etc.);

a metadata database 730 for storing metadata relating to the media items; and a media account database 732 for storing account information for user media accounts, including user profiles, credentials (e.g., user identifiers, passwords, email addresses, etc.), credentials or identifiers of any linked accounts, and the like.

In some embodiments, the media content server 104 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Each of the above identified modules stored in memory 612 and 706 corresponds to a set of instructions for performing a function described herein. The above identified modules or programs (i.e., sets of instructions) need not be implemented as separate software programs, procedures, or modules, and thus various subsets of these modules may be combined or otherwise re-arranged in various embodiments. In some embodiments, memory 612 and 706 optionally store a subset or superset of the respective modules and data structures identified above. Furthermore, memory 612 and 706 optionally store additional modules and data structures not described above. In some embodiments, modules stored in memory 612 may also be stored in memory 706 (and vice-versa). For example, the shared listening session module 630 may be stored at the media content server 104 in memory 706 and/or stored in memory 612 at the client device 102.

Although FIG. 7 illustrates the media content server 104 in accordance with some embodiments, FIG. 7 is intended more as a functional description of the various features that may be present in one or more media content servers than as a structural schematic of the embodiments described herein. In practice, and as recognized by those of ordinary skill in the art, items shown separately could be combined and some items could be separated. For example, some items shown separately in FIG. 7 could be implemented on single servers and single items could be implemented by one or more servers. The actual number of servers used to implement the media content server 104, and how features are allocated among them, will vary from one embodiment to another and, optionally, depends in part on the amount of data traffic that the server system handles during peak usage periods as well as during average usage periods.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and their practical applications, to thereby enable others skilled in the art to best utilize the embodiments and various embodiments with various modifications as are suited to the particular use contemplated.

What is claimed is:

1. A method, comprising:
   at a server system associated with a media-providing service, the server system having one or more processors and memory storing instructions for execution by the one or more processors:
   while a first electronic device is hosting a first shared listening session playing back media on a second electronic device:
   receiving, at the server system associated with the media-providing service, from a third electronic device, a first request that includes an identifier of the second electronic device on which media is playing back, before receiving a second request to join the first shared listening session playing back on the second electronic device, wherein the third electronic device obtained the identifier of the second electronic device using a discovery process before generating the first request, without interaction between the first electronic device and the third electronic device;
   in response to the first request that includes an identifier of the second electronic device on which media is playing back and in accordance with a determination that the third electronic device is authorized to access the first electronic device's shared listening sessions, automatically transmitting, to the third electronic device, a session identifier for the first shared listening session;
   after receiving the session identifier for the first shared listening session, receiving, from the third electronic device, the second request to join the first shared listening session identified by the session identifier; and
   in response to the second request, providing, to the third electronic device, access to control media playback of the first shared listening session playing back on the second electronic device.

2. The method of claim 1, including:
   providing, to the first electronic device, a first set of controls for controlling media playback of the first shared listening session; and
   providing, to the third electronic device, a second set of controls for controlling media playback of the first shared listening session, wherein the second set of controls is different from the first set of controls.

3. The method of claim 2, wherein
   the discovery process includes determining that: the second electronic device is within a proximity zone; and the third electronic device is within the proximity zone.

4. The method of claim 3, wherein the proximity zone is an area over which a local area network is provided.

5. The method of claim 3, wherein the proximity zone is an area over which a personal area network is provided by the second electronic device.

6. The method of claim 1, wherein the second request to join the first shared listening session using the session identifier for the first shared listening session further includes an indication that the third electronic device is authorized to access the first electronic device's shared listening sessions.

7. A server system of a media-providing service, comprising:
   one or more processors; and memory storing one or more programs for execution by the one or more processors, the one or more programs comprising instructions for performing a set of operations, comprising:
   while a first electronic device is hosting a first shared listening session playing back media on a second electronic device:
   receiving, at the server system associated with the media-providing service, from a third electronic device, a first request that includes an identifier of the second electronic device on which media is playing back, before receiving a second request to join the first shared listening session playing back on the second electronic device, wherein the third electronic device obtained the identifier of the second electronic device using a discovery process before generating the first request, without interaction between the first electronic device and the third electronic device;
   in response to the first request that includes an identifier of the second electronic device on which media is playing back and in accordance with a determination that the third electronic device is authorized to access the first electronic device's shared listening sessions, automatically transmitting, to the third electronic device, a session identifier for the first shared listening session;
   after receiving the session identifier for the first shared listening session, receiving, from the third electronic device, the second request to join the first shared listening session identified by the session identifier; and
   in response to the second request, providing, to the third electronic device, access to control media playback of the first shared listening session playing back on the second electronic device.

8. The server system of claim 7, wherein the set of operations includes:
   providing, to the first electronic device, a first set of controls for controlling media playback of the first shared listening session; and
   providing, to the third electronic device, a second set of controls for controlling media playback of the first shared listening session, wherein the second set of controls is different from the first set of controls.

9. The server system of claim 7, wherein the discovery process includes determining that: the second electronic device is within a proximity zone; and the third electronic device is within the proximity zone.

10. The server system of claim 9, wherein the proximity zone is an area over which a local area network is provided.

11. The server system of claim 9, wherein the proximity zone is an area over which a personal area network is provided by the second electronic device.

12. The server system of claim 7, wherein the second request to join the first shared listening session using the session identifier for the first shared listening session further includes an indication that the third electronic device is authorized to access the first electronic device's shared listening sessions.

13. A non-transitory computer-readable storage medium storing one or more programs configured for execution by a server system of a media-providing service, the one or more programs comprising instructions for performing a set of operations, comprising:
   while a first electronic device is hosting a first shared listening session playing back media on a second electronic device:
   receiving, at the server system associated with the media-providing service, from a third electronic device, a first request that includes an identifier of the second electronic device on which media is playing back, before receiving a second request to join the first shared listening session playing back on the second electronic device, wherein the third electronic device obtained the identifier of the second electronic device using a discovery process before generating the first request, without interaction between the first electronic device and the third electronic device;
   in response to the first request that includes an identifier of the second electronic device on which media is playing back and in accordance with a determination that the third electronic device is authorized to access the first electronic device's shared listening sessions, automatically transmitting, to the third electronic device, a session identifier for the first shared listening session;
   after receiving the session identifier for the first shared listening session, receiving, from the third electronic device, the second request to join the first shared listening session identified by the session identifier; and
   in response to the second request, providing, to the third electronic device, access to control media playback of the first shared listening session playing back on the second electronic device.

14. The non-transitory computer-readable storage medium of claim 13, wherein the set of operations includes:
   providing, to the first electronic device, a first set of controls for controlling media playback of the first shared listening session; and
   providing, to the third electronic device, a second set of controls for controlling media playback of the first shared listening session, wherein the second set of controls is different from the first set of controls.

15. The non-transitory computer-readable storage medium of claim 13, wherein the discovery process includes determining that: the second electronic device is within a proximity zone; and
   the third electronic device is within the proximity zone.

16. The non-transitory computer-readable storage medium of claim 15, wherein the proximity zone is an area over which a local area network is provided.

17. The non-transitory computer-readable storage medium of claim 15, wherein the proximity zone is an area over which a personal area network is provided by the second electronic device.

* * * * *